(12) United States Patent
Kokubu

(10) Patent No.: US 8,525,379 B2
(45) Date of Patent: Sep. 3, 2013

(54) MOTOR

(75) Inventor: Hiroshi Kokubu, Kosai (JP)

(73) Assignee: Asmo Co., Ltd. (JP)

(*) Notice: Subject to any disclaimer, the term of this patent is extended or adjusted under 35 U.S.C. 154(b) by 148 days.

(21) Appl. No.: 13/286,550

(22) Filed: Nov. 1, 2011

(65) Prior Publication Data

US 2012/0112579 A1  May 10, 2012

(30) Foreign Application Priority Data

Nov. 5, 2010 (JP) ................................. 2010-249169
Nov. 5, 2010 (JP) ................................. 2010-249170
Nov. 15, 2010 (JP) ................................. 2010-254956

(51) Int. Cl.
*H02K 11/00* (2006.01)

(52) U.S. Cl.
USPC .......................................... 310/71; 310/68 R

(58) Field of Classification Search
USPC ........................................ 310/68 R, 68 B, 71
See application file for complete search history.

(56) References Cited

U.S. PATENT DOCUMENTS

| | | | |
|---|---|---|---|
| 5,245,258 A | | 9/1993 | Becker et al. |
| 5,629,574 A | * | 5/1997 | Cognetti et al. ................. 310/71 |
| 6,317,332 B1 | * | 11/2001 | Weber et al. ................... 361/760 |
| 6,707,185 B2 | * | 3/2004 | Akutsu et al. ................... 310/71 |
| 7,498,701 B2 | * | 3/2009 | Kikuchi et al. ............. 310/68 B |
| 2007/0267926 A1 | * | 11/2007 | Hauenstein ...................... 310/64 |
| 2009/0079281 A1 | * | 3/2009 | Best et al. ........................ 310/71 |
| 2010/0187924 A1 | * | 7/2010 | Yagai et al. ..................... 310/71 |

* cited by examiner

*Primary Examiner* — Thanh Lam
(74) *Attorney, Agent, or Firm* — Caesar, Rivise, Bernstein, Cohen & Pokotilow, Ltd.

(57) ABSTRACT

A motor including a motor case, a rotary shaft, and a connector module. The rotary shaft is accommodated and rotated in the motor case. The connector module includes a connector unit, which is electrically connected to an external device and supplies power, and a flat control circuit substrate, which controls rotation of the rotary shaft. The motor case includes an insertion opening into which the connector module is inserted along an insertion direction. The connector module includes a connector housing, which accommodates at least part of the control circuit substrate, and a flat relay, which electrically connects the control circuit substrate and the connector unit and is arranged at a right angle relative to the control circuit substrate.

22 Claims, 16 Drawing Sheets

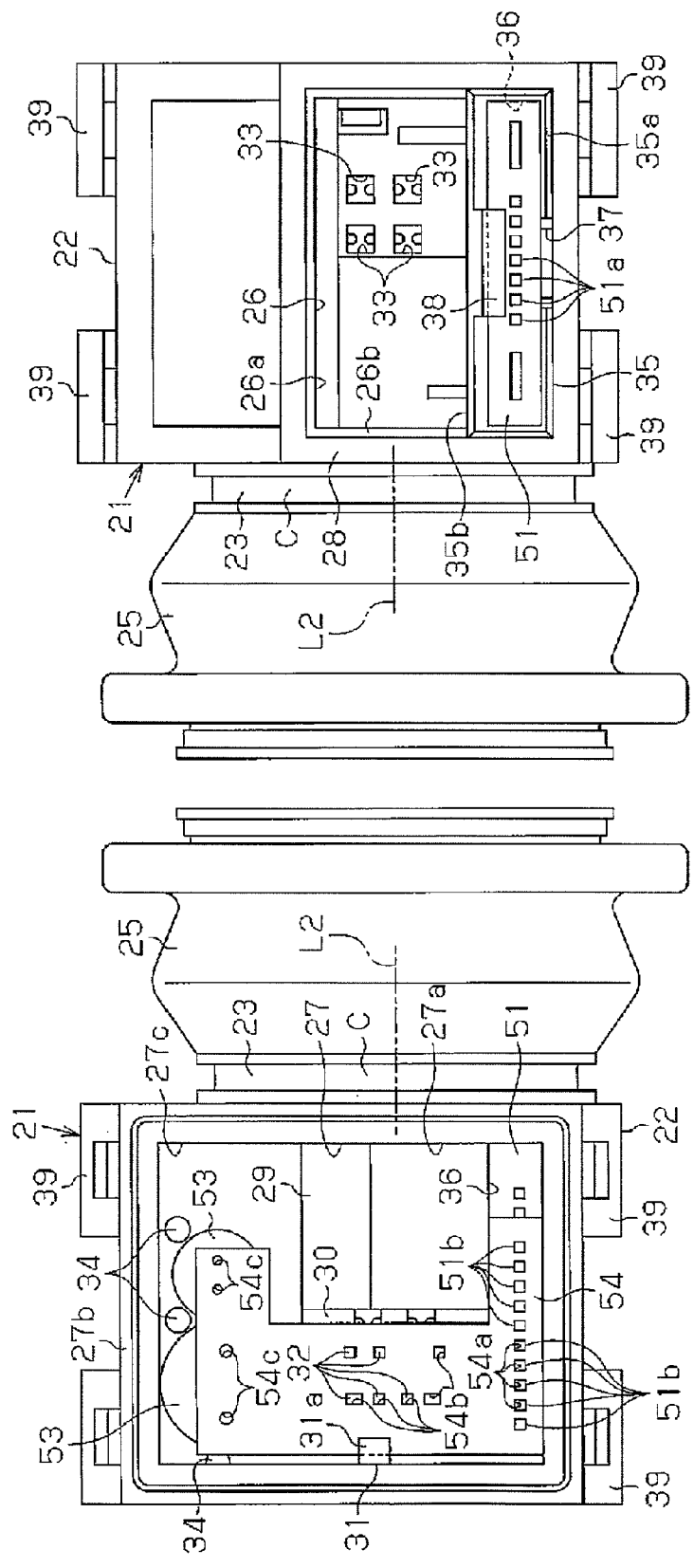

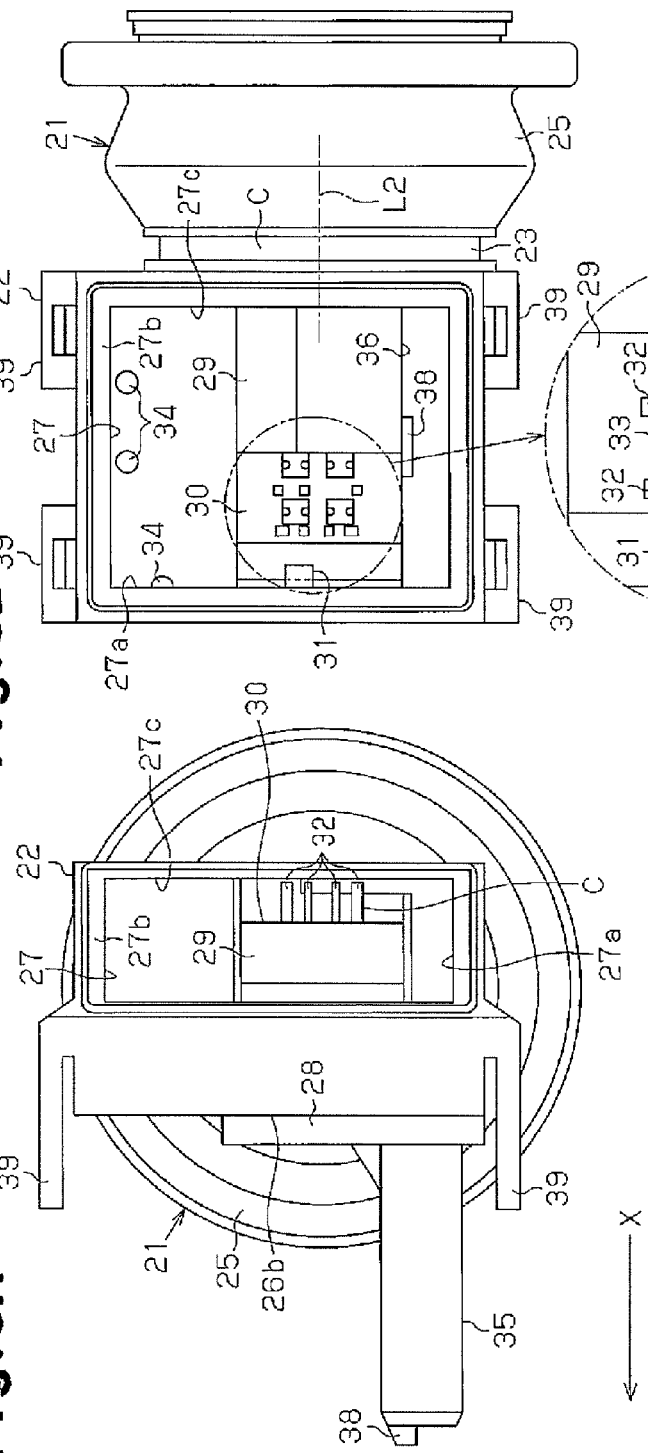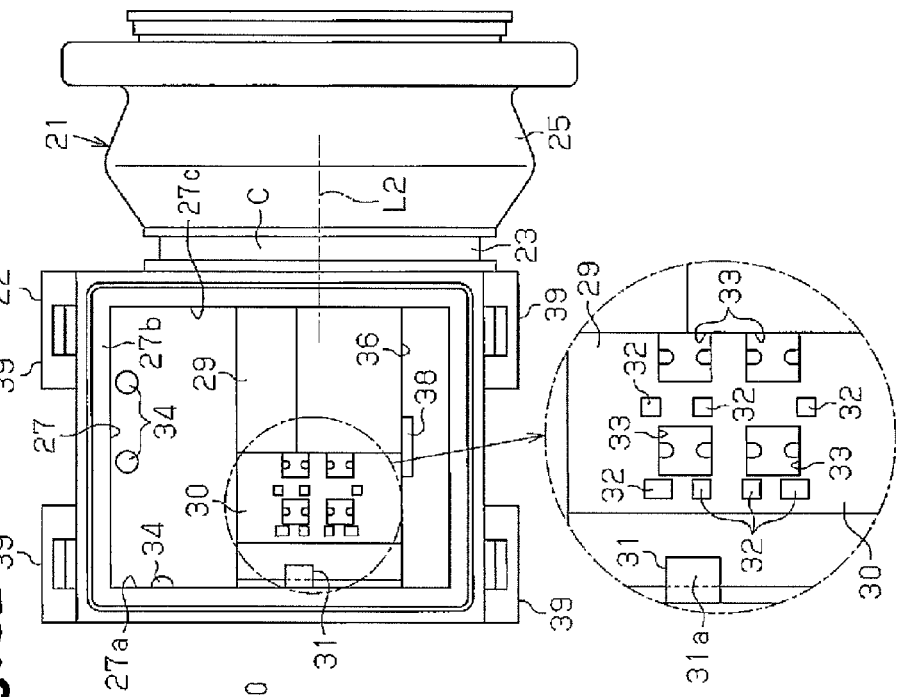

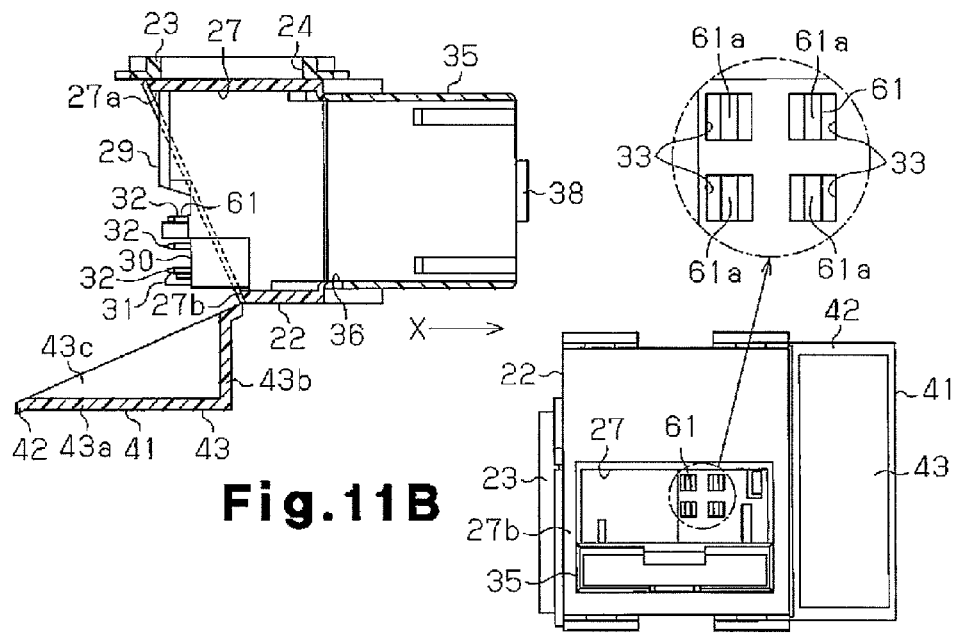

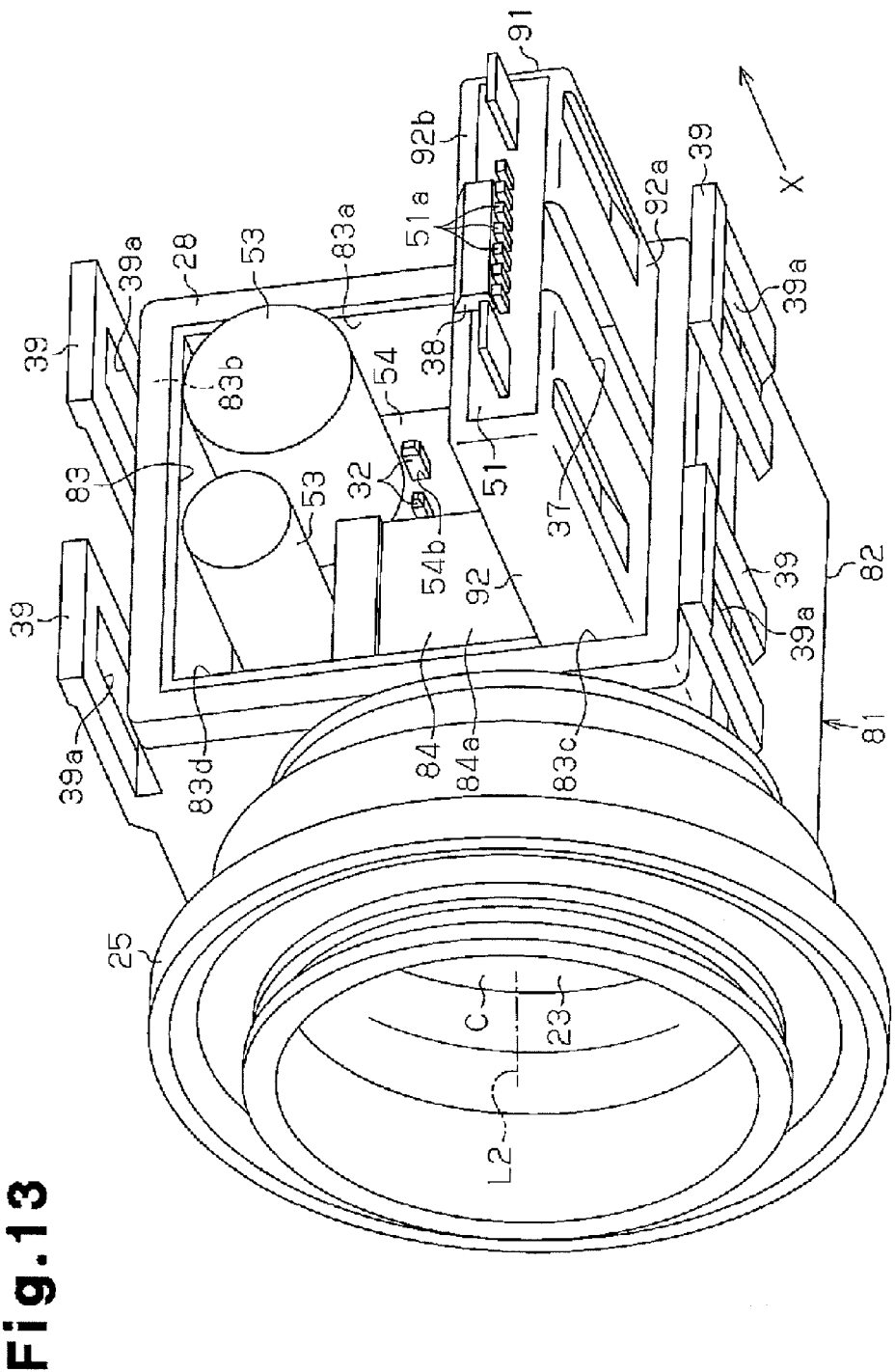

MOTOR

BACKGROUND OF THE INVENTION

The present invention relates to a motor including a control circuit substrate.

U.S. Pat. No. 5,245,258 describes an example of a motor used as a driving source for a power window device or the like. The motor includes a connector module that integrates a flat control circuit substrate, which controls and drives the motor, and a connector unit, which is connected to an external connector. The connector module is arranged in and fixed to a motor case, which accommodates a rotary shaft that is rotated.

To allow for arrangement of such a motor in various locations, it is desirable that the motor be reduced in size. However, the connector module extends sideward from the motor and thereby enlarges the motor.

SUMMARY OF THE INVENTION

It is an object of the present invention to provide a motor that reduces the size of the connector module.

One aspect of the present invention is a motor including a motor case, a rotary shaft accommodated and rotated in the motor case, and a connector module. The connector module includes a connector unit, which is electrically connected to an external device and supplies power, and a flat control circuit substrate, which controls rotation of the rotary shaft. The motor case includes an insertion opening into which the connector module is inserted along an insertion direction. The connector module includes a connector housing, which accommodates at least part of the control circuit substrate, and a flat relay, which electrically connects the control circuit substrate and the connector unit and is arranged at a right angle relative to the control circuit substrate.

BRIEF DESCRIPTION OF THE DRAWINGS

FIGS. 7A and 7B are side views showing the connector module of FIG. 6A;

FIG. 8A is a rear view showing a connector housing;

FIG. 8B is a side view showing the connector housing of FIG. 8A;

FIG. 11A is a cross-sectional view showing the connector housing of FIG. 8A;

FIG. 11B is a side view showing the connector housing of FIG. 8A;

FIG. 12 is a schematic diagram showing a process for manufacturing the connector module of FIG. 6A;

FIG. 13 a perspective view showing a connector module according to a second embodiment of the present invention;

DETAILED DESCRIPTION OF THE INVENTION

First Embodiment

A first embodiment of the present invention will be described with reference to the drawings.

Figure 1:
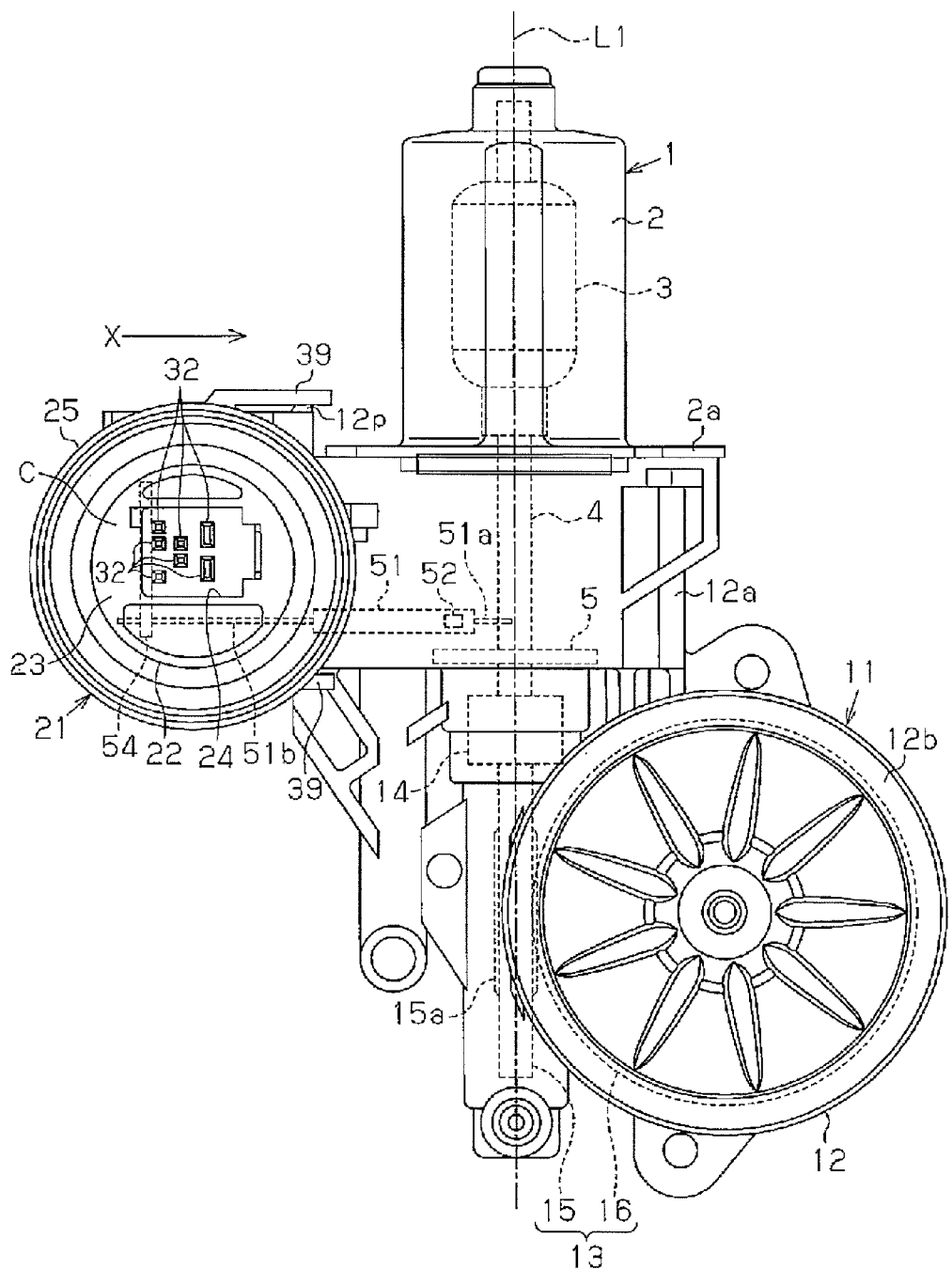
FIG. 1 is a front view showing a motor according to a first embodiment of the present invention.

A motor of the present embodiment shown in FIG. 1 is used as a driving source for a power window device that moves a window glass of a vehicle. A yoke housing (hereinafter simply referred to as the yoke 2) of a motor unit 1 located at an upper part of FIG. 1 is shaped like a cylinder whose first end (upper end in FIG. 1) is closed. Further, at an opening in the second end of the yoke 2, a flange 2a is formed which extends radially outward of the yoke 2. Inside the yoke 2, an armature 3 is arranged. A rotary shaft 4 of the armature 3 is arranged at a radial midsection of the yoke 2 and shaped like a cylinder extending in the axial direction of the yoke 2. Further, the tip (lower end in FIG. 1) of the rotary shaft 4 projects from the opening in the yoke 2 toward the outside of the yoke 2. The armature 3 is supported in the yoke 2 so that it can rotate around a central axis L1 of the rotary shaft 4.

In FIG. 1, at the lower part of the motor unit 1, a reduction gear unit 11 is connected to decrease the speed of rotational driving force transmitted from the rotary shaft 4. A resin gear housing 12 of the reduction gear unit 11 includes an integrally formed fixed portion 12a, which is fixed to the flange 2a, and a reduction gear housing portion 12b, which accommodates a reduction gear 13. The gear housing 12 and the yoke 2 are combined to form a motor case.

Figure 2:
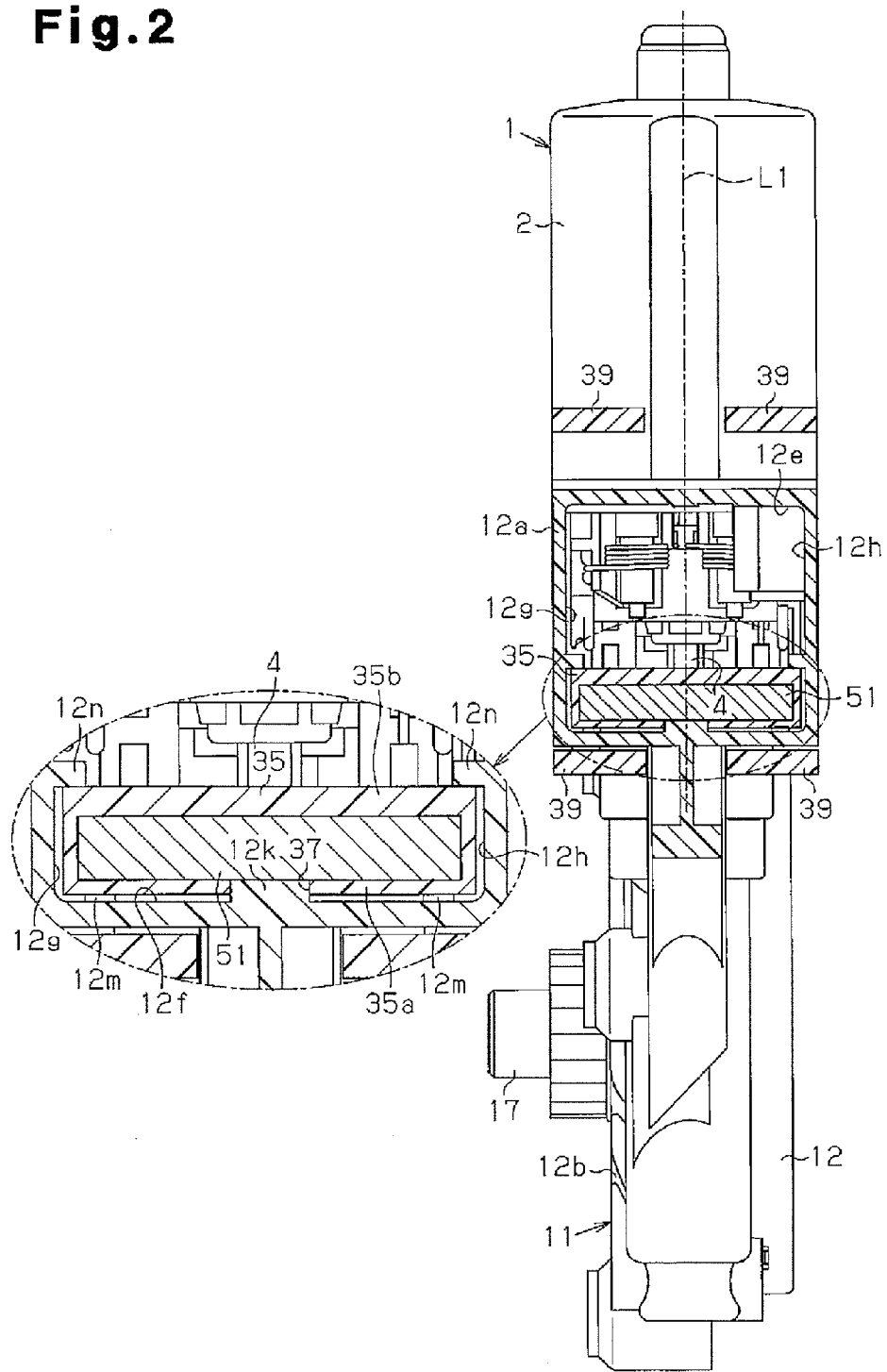
FIG. 2 is a cross-sectional view showing the motor of FIG. 1.

The fixed portion 12a is shaped generally like a hollow rectangular solid and its internal space communicates with an internal space of the yoke 2 via the opening in the yoke 2. A side of the fixed portion 12a opposite to the yoke 2 has the reduction gear housing portion 12b formed integrally with it and has its internal space communicating with the internal space of the reduction gear housing portion 12b. Further, as shown in FIG. 2, the gear housing 12 in the present embodiment has a flat shape in that it has a small thickness in one direction (right-and-left direction in FIG. 2) along the diameter of the rotary shaft 4. Moreover, the gear housing 12 exists in the one direction (right-and-left direction in FIG. 2) along the diameter of the rotary shaft 4 and is within a range of the outer diameter of the yoke 2 in the thickness direction of the gear housing 12. The gear housing 12 is flat. Thus, the motor in the present embodiment may also be flat. The thickness direction of the motor is the same as the thickness direction of the gear housing 12.

As shown in FIG. 1, a distal portion of the rotary shaft 4 projecting from the opening in the yoke 2 is arranged in the fixed portion 12a. Further, the portion of the rotary shaft 4 arranged in the fixed portion 12a has an annular sensor magnet 5 fixed on it so that it can rotate integrally with the rotary shaft 4. The sensor magnet 5 is magnetized so that its N pole and S pole may alternate circumferentially.

Further, the tip of the rotary shaft 4 is coupled to the base end portion of a worm shaft 15 accommodated in the reduction gear housing portion 12b by a clutch 14 accommodated in the fixed portion 12a. The clutch 14 transmits rotational driving force from the rotary shaft 4 to the worm shaft 15 but does not transmit torque from the worm shaft 15 to the rotary shaft 4.

Figure 3:
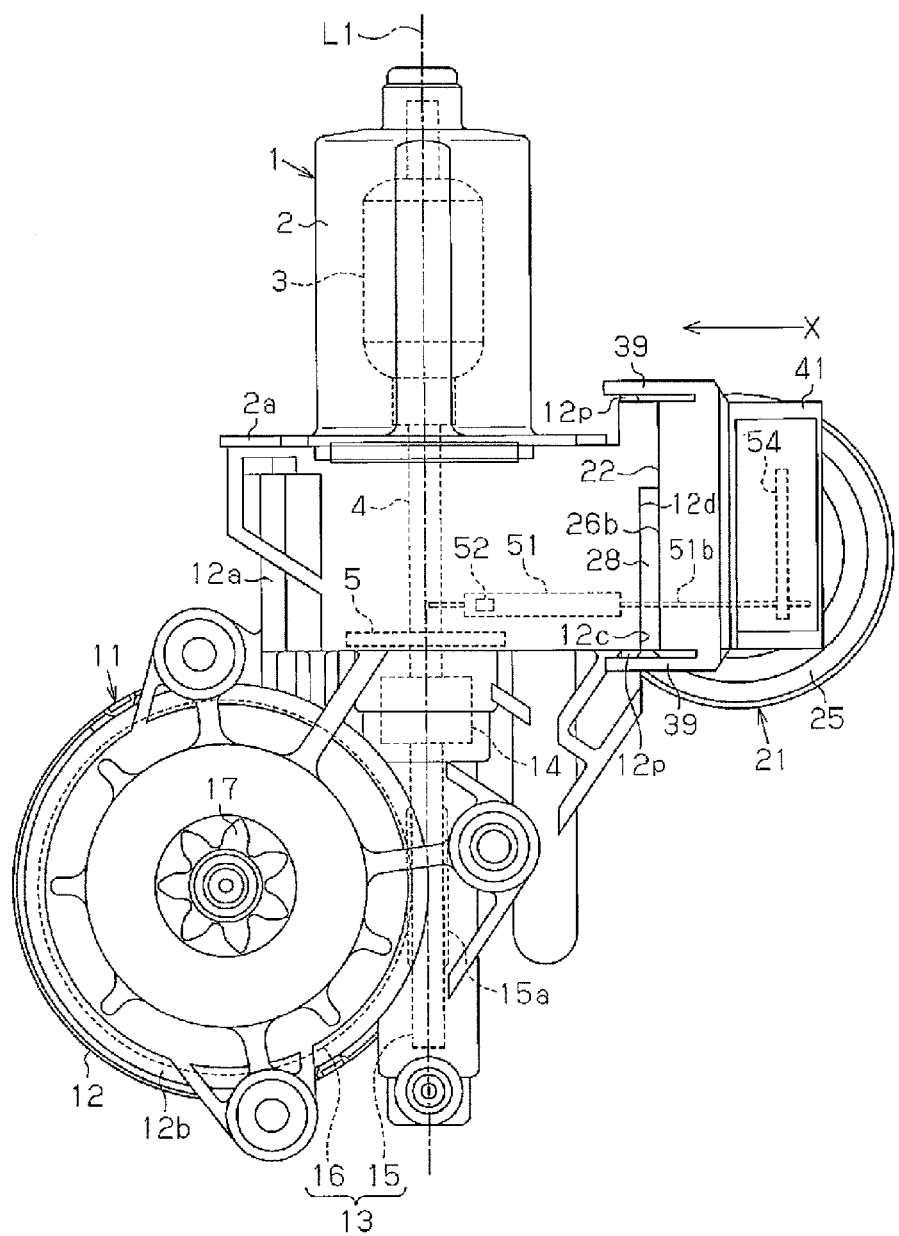
FIG. 3 is a rear view showing the motor of FIG. 1.
Figure 4:
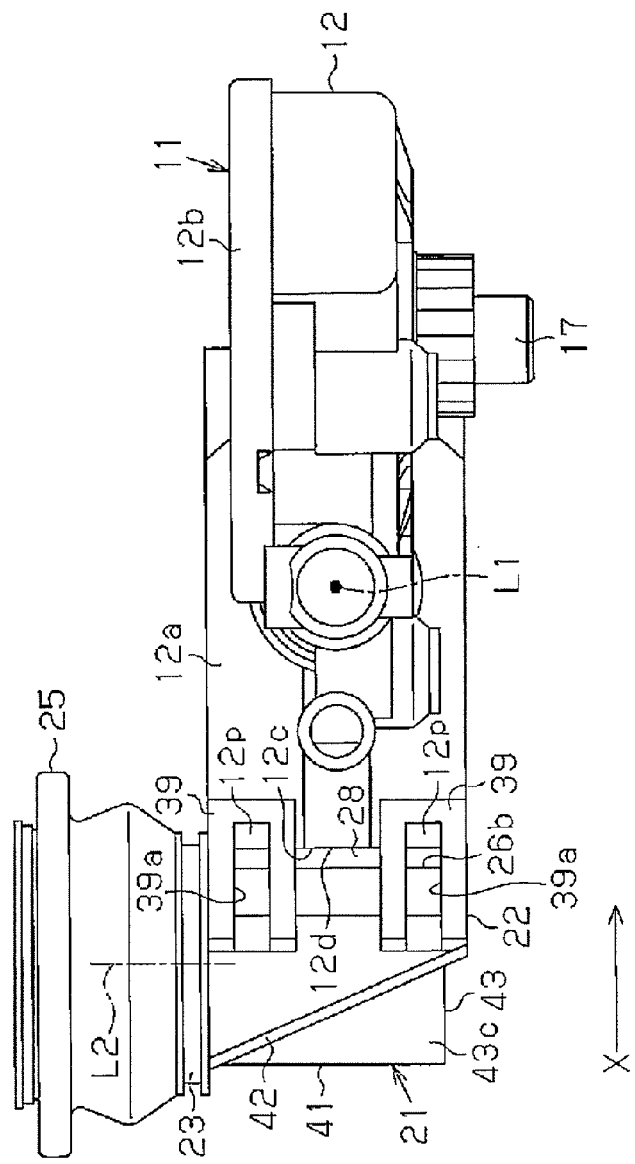
FIG. 4 is a bottom view showing the motor of FIG. 1.

As shown in FIG. 3, the worm shaft 15 is arranged coaxially with the rotary shaft 4 and has a threaded worm 15a formed at generally its axial midsection. Further, beside the worm shaft 15 (on the left side in FIG. 3) in the reduction gear housing portion 12b, a disc-shaped worm wheel 16 is arranged which meshes with the worm 15a. The worm wheel 16 and the worm shaft 15 are combined to form the reduction gear 13. The worm wheel 16 is arranged in the reduction gear housing portion 12b so that its axial direction is the same as the thickness direction of the gear housing 12. Further, at the radial midpoint of the worm wheel 16, an output shaft 17 extending in the thickness direction of the gear housing 12 is mounted so that it can rotate integrally with the worm wheel 16. As shown in FIG. 4, the tip of the output shaft 17 projects to the outside of the gear housing 12 and is coupled to a vehicle window glass by a window regulator (not shown).

Further, as shown in FIG. 3, in the fixed portion 12a, a connector module 21 is fixed to a first end (right end in FIG. 3) in a direction (right-and-left direction in FIG. 3) that orthogonally intersects with the thickness direction of the gear housing 12 and the axial direction of the rotary shaft 4.

Figure 5:
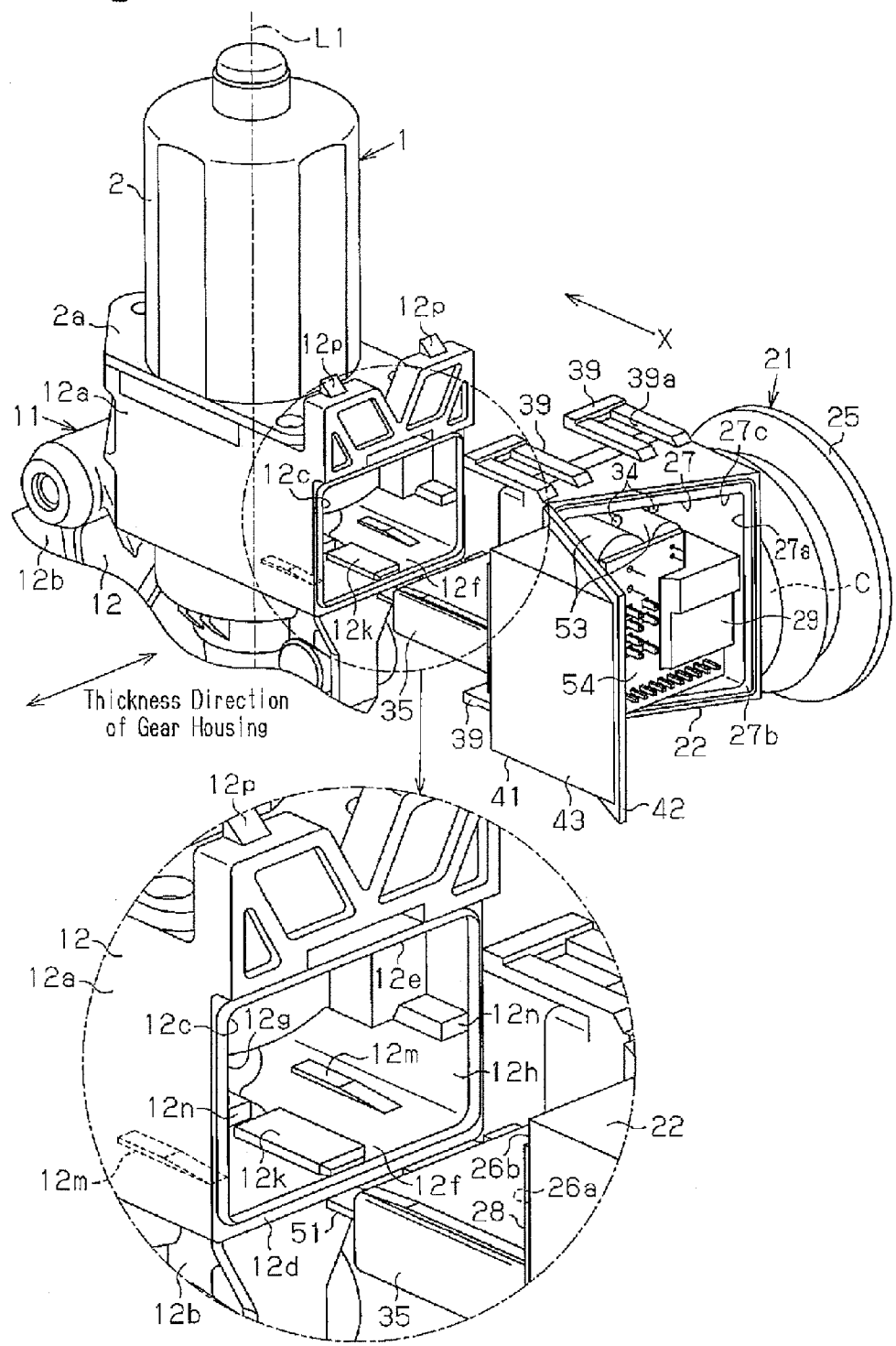
FIG. 5 is an exploded perspective view showing the motor of FIG. 1.

As shown in FIG. 5, the fixed portion 12a has an insertion opening 12c formed in its first end (right end in FIG. 5) in a direction that orthogonally intersects with the thickness direction of the gear housing 12 and the central axis L1 of the rotary shaft 4. The insertion opening 12c is formed in the direction that orthogonally intersects with the thickness direction of the gear housing 12 and the central axis L1 of the rotary shaft 4, while an opening end face 12d (hereinafter referred to as insertion opening end face 12d) around the insertion opening is parallel with the central axis L1 of the rotary shaft 4. Further, the insertion opening 12c is shaped like a rectangle when viewed from the opening.

Further, the fixed portion 12a has a generally rectangular tube-shaped inner circumference surface that extends to the interior of the fixed portion 12a from the insertion opening 12c. The inner circumference surface of the fixed portion 12a includes a pair of first internal surfaces 12e and 12f, which extend orthogonally to the central axis L1 and are separate from each other in the central axis L1, and a pair of second internal surfaces 12g and 12h, which respectively extend parallel to the central axis L1 at both sides of those first internal surfaces 12e and 12f. The first internal surface 12f closer to the reduction gear housing portion 12b than its pair counterpart the first internal surface 12e includes an insertion guide protrusion 12k formed on it. The insertion guide protrusion 12k is formed at a midsection of the first internal surface 12f in the thickness direction of the gear housing 12 and projects in the direction of the central axis L1. Moreover, the insertion guide protrusion 12k extends toward the interior of the fixed portion 12a from the insertion opening 12c, that is, parallel to an insertion direction X of the connector module 21 to the fixed portion 12a when the connector module 21 is fixed to the fixed portion 12a. The insertion direction X in the present embodiment is parallel with a direction that orthogonally intersects with the thickness direction of the gear housing 12 and the central axis L1 of the rotary shaft 4.

Further, the first internal surface 12f includes a pair of first axial positioning projections 12m respectively on both sides in the width direction of the insertion guide protrusion 12k. The pair of first axial positioning projections 12m project toward the central axis L1 of the rotary shaft 4 and extend parallel to the insertion direction X. Further, one end of each of the first axial positioning projections 12m that is closer to the insertion opening 12c is formed so that its amount of projection toward the central axis L1 increases at locations inward in the fixed portion 12a from the edge closer to the insertion opening 12c. At the edge of each first axial positioning projection 12m that is closer to the insertion opening 12c, the amount of projection toward the central axis L1 of the rotary shaft 4 is subtle. At the edge of each of the first axial positioning projections 12m on the interior side of the fixed portion 12a, the projection amount toward the central axis L1 of the rotary shaft 4 is constant.

Each of the second internal surfaces 12g and 12h has a second axial positioning projection 12n. The second axial positioning projection 12n projects in the thickness direction of the gear housing 12 from the second internal surface 12g or 12h and extends toward the interior of the fixed portion 12a from the insertion opening 12c parallel to the insertion direction X. Further, the two second axial positioning projections 12n are separate from the first axial positioning projection 12m in the direction of the central axis L1.

The part of the fixed portion 12a forming the periphery of the insertion opening 12c includes four hooking protrusions 12p. Two of the four hooking protrusions 12p project toward a motor unit 1 along the central axis L1 at a part of the fixed portion 12a (above the insertion opening 12c in FIG. 5) that is closer to the motor unit 1 than the insertion opening 12c. Moreover, these two hooking protrusions 12p are spaced apart from each other in the thickness direction of the gear housing 12. Further, as shown in FIG. 4, the remaining two hooking protrusions 12p project toward the reduction gear housing portion 12b along the central axis L1 at a part of the fixed portion 12a that is closer to the reduction gear housing portion 12b than the insertion opening 12c. Moreover, those two hooking protrusions 12p are separate from each other in the thickness direction of the gear housing 12. Further, the four hooking protrusions 12p are formed within the thickness of the motor in the thickness direction of the motor and do not project beyond the gear housing 12 and the yoke 2 in the thickness direction of the motor.

Figure 6A:
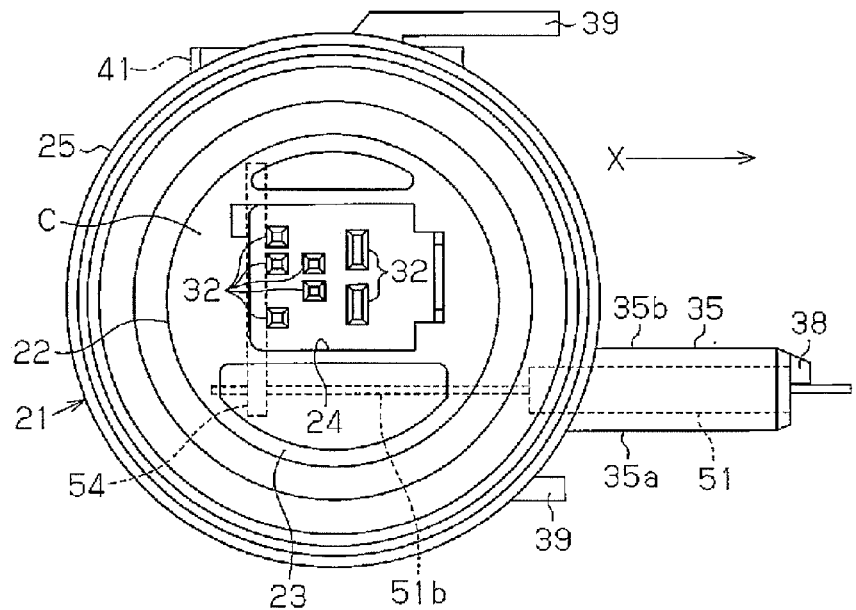
FIG. 6A is a front view showing a connector module.
Figure 6B:
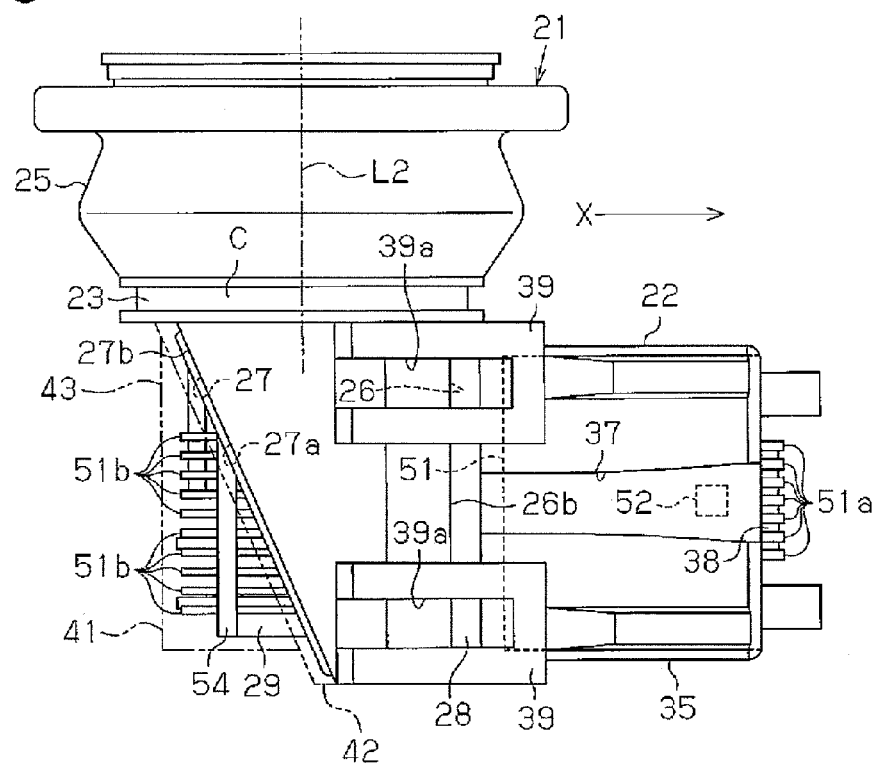
FIG. 6B is a bottom view showing the connector module of FIG. 6A.

As shown in FIG. 5, a connector housing 22 of the connector module 21 is formed from a resin material and has a circumference surface shaped like a rectangular tube that extends in the insertion direction X. As shown in FIGS. 6A and 6B, one side surface of the connector housing 22 has a disc-shaped connector connection portion 23. The connector connection portion 23 is formed so that its axial direction may be parallel with the insertion direction X. Further, at a radial midpoint of the connector connection portion 23, an insertion hole 24 is formed which extends from the connector connection portion 23 to the interior of the connector housing 22. The insertion hole 24 extends along an axis L2 of the connector connection portion 23 and its inner circumference surface is shaped corresponding to the outer shape on an external connector (not shown) which is inserted into the insertion hole 24. Further, the connector connection portion 23 has its outer circumference enclosed by a generally cylindrical connector boot 25. The connector boot 25 is used to prevent water from entering the insertion hole 24. The connector boot 25 in the present embodiment is formed integrally with the connector housing 22 from an elastomer.

In FIG. 6B, the connector housing 22 has a first end and a second end in the insertion direction X. The front one of the two ends in the insertion direction X defines the first end and the rear one of the two ends defines the second end.

In FIGS. 7A and 7B, the insertion direction X extends perpendicular to the plane of the drawings. As shown in FIG. 7B, the first end of the connector housing 22 includes a connection recess 26 formed in the insertion direction X. As shown in FIG. 7A, the second end of the connector housing 22 has an insertion recess 27 formed along the insertion direction X. The connection recess 26 has a connection opening 26a that opens toward the insertion direction X, while the insertion recess 27 has an insertion opening 27a that opens toward the opposite side of the insertion direction X.

As shown in FIG. 7B, the connection opening 26a is shaped like a rectangle having almost the same size as the insertion opening 12c shown in FIG. 5. Further, as shown in FIG. 7B, an opening end face 26b (hereinafter referred to as the connection opening end face 26b) around the connection opening 26a orthogonally intersects with the insertion direction X (that is, is parallel to the axis L2 of the connector connection portion 23) and is formed integrally with a seal 28 made of an elastomer. The seal 28 is partially coupled with the connector boot 25. That is, the seal 28 and the connector boot 25 are formed integrally with each other.

As shown in FIGS. 6B and 7A, the insertion opening 27a is inclined with respect to the insertion direction X and shaped like a rectangle. An opening end face 27b (hereinafter referred to as insertion opening end face 27b) around the insertion opening 27a is inclined with respect to the insertion direction X. Specifically, as shown in FIG. 7A, the insertion opening end face 27b is inclined so that the distance from the connection opening end face 26b decreases as the connector connection portion 23 becomes farther along the axis L2 of the connector connection portion 23. Further, the insertion opening end face 27b is shaped like a flat surface.

Figure 9:
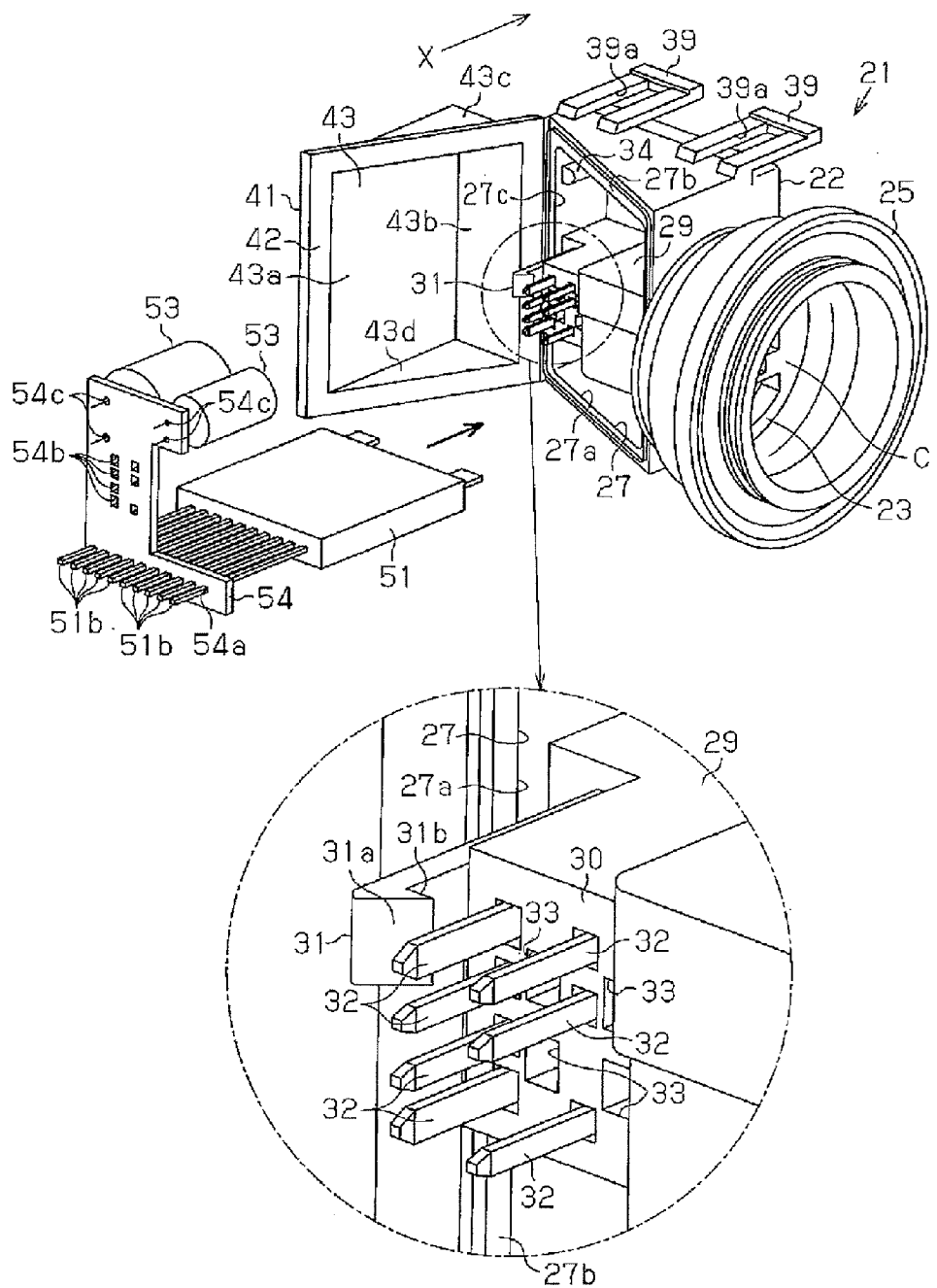
FIG. 9 is an exploded perspective view showing the connector module of FIG. 6A.

As shown in FIGS. 8A and 8B, in the insertion recess 27, a terminal holding portion 29 projects from the bottom surface of the insertion recess 27. The terminal holding portion 29 is formed in the insertion recess 27 close to the midpoint in a direction (up-and-down direction in FIG. 8B) that orthogonally intersects with the insertion direction X and the axis L2 of the connector connection portion 23. Further, a tip face of the terminal holding portion 29 has a positioning face 30 that orthogonally intersects with the insertion direction X. Moreover, as shown in FIG. 9, the end of the terminal holding portion 29 on the opposite side of the connector connection portion 23 has a rod-shaped positioning pin 31. At the tip of the positioning pin 31, a positioning protrusion 31a projecting to the side of the connector connection portion 23 is formed, while the face of the positioning protrusion 31a on the side of the base end of the positioning pin 31 defines an abutment face 31b, which is parallel with a positioning face 30.

As shown in FIGS. 6A and 6B, a plurality of (seven in the present embodiment) connector terminals 32 are insert-molded and embedded in the connector housing 22. The connector terminals 32 are formed of a conductive metal material. The connector terminals 32 extend from the inside of the insertion hole 24 along the axis L2 of the connector connection portion 23 to a location between the connection recess 26 and the insertion recess 27 in the connector housing 22 and then bend at 90 degrees to extend inside the terminal holding portion 29 parallel to the insertion direction X. That is, each connector terminal 32 in the present embodiment is L-shaped and bends only at one position in its longitudinal direction. Further, an end of each connector terminal 32 close to the connector connection portion 23 projects from the bottom surface of the insertion hole 24 to the internal space of the insertion hole 24, while the other end of each of the connector terminal 32 close to the terminal holding portion 29 projects from the positioning face 30 to the outside of the connector housing 22. The connector terminals 32 are held in the connector housing 22 in a separated state. A connector unit C is formed by the connector terminals 32, the connector connection portion 23, and the insertion hole 24.

As shown in FIGS. 7B and 8B, the connector housing 22 has a plurality of (four in the present embodiment) cutting holes 33 that extend through the connector housing 22 along the insertion direction X. Each cutting hole 33 is formed between the plurality of connector terminals 32. Further, each cutting hole 33 has ends located in the bottom surface of the connection recess 26 and in the positioning face 30. Therefore, each cutting hole 33 extends through the connector housing 22 to communicate with the connection opening 26a and the insertion opening 27a.

As shown in FIG. 8B, in the insertion recess 27, the side (upper side in the figure) of the terminal holding portion 29 provides an element accommodation portion 27c. In the element accommodation portion 27c, a plurality of (three in the present embodiment) restriction projections 34 are formed. Each restriction projection 34 is formed in the vicinity of the inner circumference surface of the element accommodation portion 27c and shaped like a column extending along the insertion direction X.

As shown in FIG. 7B, in the connection recess 26, a substrate holder 35 holds a flat control circuit substrate 51. As shown in FIG. 1, the control circuit substrate 51 is a control circuit device for controlling rotation of the rotary shaft 4 and includes a Hall IC 52 to detect the rotation of the rotary shaft 4. The control circuit substrate 51 in the present embodiment is plate-shaped and formed by covering a circuit substrate, on which a plurality of electronic components are mounted, with an insulating resin material. Further, from a first end of the control circuit substrate 51 parallel with the insertion direction X, a plurality of first connection terminals 51a extend toward the front side in the insertion direction X, while from a second end of the control circuit substrate 51 a plurality of second connection terminals 51b extend toward the rear side in the insertion direction X.

As shown in FIG. 7B, the substrate holder 35 is lower than the cutting hole 33 in the connection recess 26 in FIG. 7B and formed integrally with the connector housing 22. The substrate holder 35 is shaped like a rectangular tube corresponding to the outer shape of the control circuit substrate 51 and extends parallel to the insertion direction X. Further, the substrate holder 35 along the insertion direction X is larger in length than the depth of the connection recess 26 and extends from the bottom surface of the connection recess 26 through the connection opening 26a to the outside of the connection recess 26. Moreover, as shown in FIG. 2, the substrate holder 35 is formed so that its thickness (vertical width in FIG. 2) is equal to the interval in the direction of the central axis L1 between the first axial positioning projection 12m and the second axial positioning projection 12n.

Further, as shown in FIGS. 7B and 8B, part of the bottom portion of the connection recess 26 on the side of the interior of the substrate holder 35 includes an insertion hole 36 that communicates with the connection recess 26 and the insertion recess 27. The insertion hole 36 has an inner circumference surface shaped like a rectangular tube that apparently extends parallel to the insertion direction X on the inner circumference surface of the substrate holder 35. The control circuit substrate 51 can be inserted from the side of the insertion recess 27 to the inside of the substrate holder 35 via the insertion hole 36.

As shown in FIG. 2, the substrate holder 35 has an insertion guide 37 that guides insertion of the control circuit substrate 51 into the fixed portion 12a when inserting the control circuit substrate 51 from the insertion opening 12c into the fixed portion 12a. As shown in FIGS. 6B and 7B, the insertion guide 37 is formed on a side wall 35a closer to the outside of the connector housing 22 than its counterpart side wall 35b in the thickness direction of the substrate holder 35. The insertion guide 37 is shaped like a slit that extends parallel to the insertion direction X at the axial midpoint of the connector connection portion 23 on the side wall 35a. Part of the insertion guide 37 close to the base end of the substrate holder 35 is formed to have the same width as that of the insertion guide protrusion 12k (see FIG. 2). Part of the insertion guide 37 close to the tip of the substrate holder 35 is formed so that its width may increase gradually toward the tip of the substrate holder 35 as shown in FIG. 6B.

Moreover, as shown in FIG. 6A, the tip of the substrate holder 35 has a substrate positioning protrusion 38 for positioning the control circuit substrate 51 in the insertion direction X with respect to the substrate holder 35. The substrate positioning protrusion 38 is formed on the side wall 35b closer to the interior of the connector housing 22 than its counterpart side wall 35a in the thickness direction of the substrate holder 35. The substrate positioning protrusion 38 projects along the insertion direction X at the midpoint of the tip face of the side wall 35b and also projects toward the inside of the substrate holder 35 more than the inner circumference surface of the substrate holder 35.

As shown in FIGS. 7B and 8B, the control circuit substrate 51 is inserted from the side of the insertion recess 27 via the insertion hole 36 into the substrate holder 35. The control circuit substrate 51 is inserted from the end where the first connection terminal 51a extends into the substrate holder 35. As shown in FIG. 6A, the control circuit substrate 51 held by the substrate holder 35 is arranged parallel to the insertion direction X. Further, the control circuit substrate 51 is inserted into the substrate holder 35 until it abuts against the substrate positioning protrusion 38 along the insertion direction X. The substrate positioning protrusion 38 positions the control circuit substrate 51 in the insertion direction X and prevents separation of the substrate holder 35. Moreover, the control circuit substrate 51 inserted into the substrate holder 35 has its circumferential surface abut against the inner circumference surface of the substrate holder 35. Therefore, the control circuit substrate 51 is positioned with respect to the connector housing 22 by the substrate holder 35. Further, as shown in FIG. 6B, on the control circuit substrate 51 held by the substrate holder 35, each of the plurality of second connection terminals 51b extends in the direction opposite to the insertion direction X and has its tip projecting from the insertion opening 27a toward the outside of the connector housing 22.

As shown in FIG. 7A, the element accommodation portion 27c includes two anti-noise elements 53. Each of the anti-noise elements 53 is inserted into the element accommodation portion 27c so that its terminal is positioned close to the insertion opening 27a in the insertion recess 27. The anti-noise elements 53 are capacitors and are electronic components that eliminate electric noise.

As shown in FIGS. 6A and 7A, a flat relay 54 is connected to the plurality of second connection terminals 51b and project out of the insertion opening 27a to the connector housing 22. The relay 54 electrically connects the connector terminal 32 and the control circuit substrate 51 and is a printed circuit board in the present embodiment. Part of the relay 54 that faces the insertion hole 36 in the insertion direction X has a plurality of first through holes 54a that correspond to the plurality of second connection terminals 51b respectively. Further, part of the relay 54 that faces the positioning face 30 in the insertion direction X has a plurality of second through holes 54b into which the ends of the plurality of connector terminals 32 projecting from the positioning face 30 are inserted respectively. Moreover, part of the relay 54 that faces the element accommodation portion 27c in the insertion direction X includes two pairs of third through holes 54c.

The relay 54 is arranged at a right angle relative to the control circuit substrate 51, which is held by the substrate holder 35, and is also orthogonal to the insertion direction X (that is, the thickness direction of the relay 54 may be parallel with the insertion direction X). The second connection terminals 51b of the control circuit substrate 51 are inserted into the plurality of first through holes 54a respectively, while the ends of the connector terminals 32 projecting from the positioning face 30 are inserted into the plurality of second through holes 54b respectively. Moreover, the terminals of the anti-noise elements 53 are inserted into the pair of third through holes 54c in the relay 54. The second connection terminals 51b, the connector terminals 32, and the terminals of the anti-noise elements 53 are electrically connected to the relay 54 by soldering. Further, each of the electronic components mounted on the relay 54 (i.e., the control circuit substrate 51, the anti-noise elements 53, etc.) are arranged so that their surfaces face the insertion direction X of the relay 54. In the present embodiment, all the electronic components mounted on the relay 54 are mounted on the internal surface of the connector housing 22 in the relay 54. Further, the insertion opening end face 27b is inclined so that its distance from the connection opening end face 26b decreases as the connector connection portion 23 becomes farther along the axis L2 of the connector connection portion 23. Accordingly, the second connection terminals 51b of the control circuit substrate 51, the terminals of the anti-noise elements 53, and the connection portions between the connector terminals 32 and the relay 54 project (are exposed) to the outside of the connector housing 22. That is, the insertion opening end face 27b is inclined with respect to the insertion direction X so that the connection portions between the second connection terminals 51b and the relay 54 may project from the insertion opening 27a to the outside of the connector housing 22.

Figure 10:
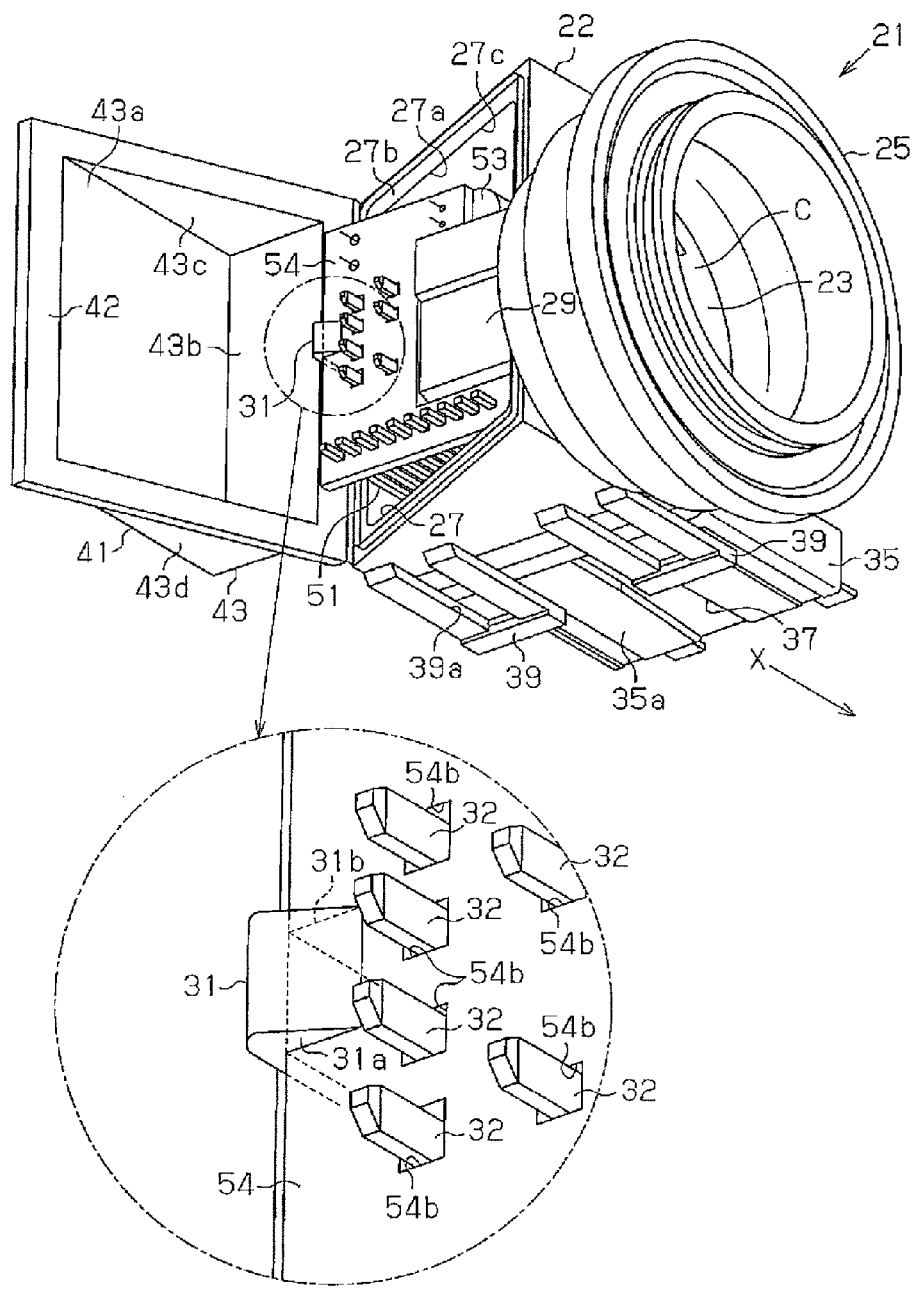
FIG. 10 is a perspective view showing the connector module of FIG. 6A.

Further, as shown in FIGS. 9 and 10, the relay 54 is mounted to the connector housing 22 over the positioning protrusion 31a by pressing down the positioning pin 31 through elastic deformation. Then, one of the two surfaces of the relay 54 in the thickness direction on the side of the bottom surface of the insertion recess 27 abuts against the positioning face 30 in the insertion direction X, while the abutment face 31b of the positioning protrusion 31a abuts against the other surface on the opposite side of the bottom surface of the insertion recess 27 in the insertion direction X. In such a manner, the relay 54 is positioned with respect to the connector housing 22 in the insertion direction X when sandwiched between the positioning face 30 and the positioning pin 31.

Further, the anti-noise element 53 inserted in the element accommodation portion 27c is arranged near the restriction projection 34. Therefore, if the anti-noise element 53 is tilted, the anti-noise element 53 abuts against the restriction projection 34 and is prevented from being further tilted.

The insertion opening 27a is closed by a lid 41. The lid 41 is shaped generally like a dish corresponding to the insertion opening 27a. Further, the lid 41 is shaped so that the connector housing 22 having the insertion opening 27a closed by the lid 41 may be shaped generally like a rectangular solid including the lid 41. Specifically, the lid 41 is made of a flange portion 42 shaped like a rectangular frame enclosing the insertion opening 27a and a dish-shaped closing portion 43 integrally mounted inside the flange portion 42. As shown in FIG. 4, the closing portion 43 is formed so that its depth in the insertion direction X increases as the connector connection portion 23 becomes farther in the axis direction of the connector connection portion 23 when the flange portion 42 abuts against the insertion opening end face 27b. As shown in FIG. 10, a bottom 43a of the closing portion 43 is shaped like a rectangular plate. Further, a central side wall 43b of three side walls 43b to 43d of the closing portion 43 that couples the flange portion 42 and the bottom 43a is rectangle-shaped and at a right angle with the bottom 43a. Moreover, the side walls 43c and 43d on the respective sides of the central side wall 43b form a rectangular triangle that a width between the bottom 43a and the flange portion 42 may decrease as the side wall 43b becomes farther and its oblique side may form a boundary with the flange portion 42. Therefore, as shown in FIG. 4, the closing portion 43 is shaped like a rectangular triangle when viewed in a direction that orthogonally intersects with the insertion direction X and the axis direction of the connector connection portion 23. Further, as shown in FIG. 10, the lid 41 in the present embodiment is formed integrally with the connector housing 22. That is, part of the flange portion 42 that neighbors the side wall 43b is coupled to one side of the insertion opening 27a on the opposite side of the connector connection portion 23. The lid 41 is pivotal relative to the connector housing 22 by bending the coupling portion.

As shown in FIG. 6B, the lid 41 causes the flange portion 42 to abut against the insertion opening end face 27b while accommodating in the closing portion 43 the parts of the relay 54, second connection terminals 51b, connector terminals 32, and terminals of the anti-noise elements 53 that project from the insertion opening 27a to the outside of the connector housing 22. The flange portion 42 and the insertion opening end face 27b are joined to each other by ultrasonic welding. By welding the flange portion 42 and the insertion opening end face 27b to each other, a liquid is prevented from entering the connector housing 22 from between the lid 41 and the insertion opening end face 27b.

As shown in FIG. 5, on the outer circumference surface of the connector housing 22, four hook claws 39 (hooks) are formed which engage with the respective four hooking protrusion 12p formed on the fixed portion 12a. Each pair of the hook claws 39 are formed on the respective end faces of the connector housing 22 in a direction that orthogonally intersects with the insertion direction X and the axis direction of the connector connection portion 23. Each of the hook claws 39 extends in the insertion direction X and has a hook hole 39a formed in it that is capable of hooking the hooking protrusion 12p.

The connector module 21 is inserted into the fixed portion 12a in the insertion direction X so that the substrate holder 35 holding the control circuit substrate 51 may be inserted into the fixed portion 12a through the insertion opening 12c when the connection opening 26a faces the insertion opening 12c. In this case, insertion of the substrate holder 35 into the fixed portion 12a is guided by inserting the substrate holder 35 into the fixed portion 12a while inserting the insertion guide protrusion 12k into the insertion guide 37. Further, the insertion of the substrate holder 35 into the fixed portion 12a is guided also by the first axial positioning projection 12m and the second axial positioning projection 12n by being inserted between the first axial positioning projection 12m and the second axial positioning projection 12n.

If the seal 28 is moved in the insertion direction X until it abuts against the insertion opening end face 12d, each hook claws 39 on the connector module 21 is snap-fitted to the corresponding hooking protrusion 12p. As a result, the hook hole 39a of each hook claw 39 receives the corresponding hooking protrusion 12p. In such a manner, through the engagement of the hook claw 39 and the hooking protrusion 12p, the connector module 21 is fixed to the fixed portion 12a so that it cannot be moved in a direction opposite to the insertion direction X. Further, as shown in FIG. 4, the four hook claws 39 hooked to the respective hooking protrusions 12p do not project in the thickness direction of the motor beyond the yoke 2 and the gear housing 12. That is, the hook claws 39 are all formed to be within the range of the thickness of the motor.

Further, the seal 28 is adhered to the insertion opening end face 12d when the connector module 21 is fixed to the fixed portion 12a. Therefore, liquid is prevented from entering the motor from between the connection opening end face 26b and the insertion opening end face 12d.

Further, as shown in FIG. 2, when the connector module 21 is fixed to the fixed portion 12a, the substrate holder 35 is positioned to the fixed portion 12a in the circumference direction (circumference direction of the rotary shaft 4, right-and-left direction in FIG. 2) by the insertion guide protrusion 12k inserted into the insertion guide 37. Moreover, the substrate holder 35 is sandwiched between the first axial positioning projection 12m and the second axial positioning projection 12n on the respective axial sides of the rotary shaft 4. Accordingly, the first axial positioning projection 12m and second axial positioning projection 12n position the substrate holder 35 with respect to the fixed portion 12a in the axial direction (direction of central axis L1). Further, as shown in FIG. 3, if the control circuit substrate 51 is inserted into the fixed portion 12a, the first connection terminal 51a is connected to the armature 3 (for example, electrically connected to a power feeding brush, which is not shown in the drawings, in contact with the armature 3) so that power can be fed, and the Hall IC 52 included in the control circuit substrate 51 axially faces the sensor magnet 5.

In the motor having such a configuration, an external connector (not shown) for electric signal inputting/outputting and power feeding is inserted into the insertion hole 24 in the connector connection portion 23. If power is fed to the armature 3 via the connector terminal 32, the armature 3 (rotary shaft 4) is rotated. The rotational driving force of the rotary shaft 4 is transmitted by the clutch 14 to the worm shaft 15 and slowed by the worm 15a and the worm wheel 16 for the output shaft 17. Accordingly, in accordance with the direction in which the output shaft 17 rotates, the window glass is moved down or up by the window regulator coupled to the output shaft 17.

Further, if the armature 3 is rotated, the sensor magnet 5 rotates along with the rotary shaft 4. A change in magnetic field caused by the rotation of the sensor magnet 5 is detected by the Hall IC 52 included in the control circuit substrate 51. The Hall IC 52 outputs a rotation detection signal, which is an electric signal that is in accordance with a change in magnetic field caused by the rotation of the sensor magnet 5. Rotation information (rotation speed, rotation angle, etc.) of the armature 3 is detected on the basis of the rotation detection signal, while power is fed to the armature 3 in accordance with the detected rotation information.

A method for manufacturing the connector module 21 in the present embodiment will now be described.

First, as shown in FIG. 11A, a connector housing formation process (support process) is performed for forming the connector housing 22. In the connector housing formation process, a terminal material 61 of the plurality of connector terminals 32 is arranged in a mold (not shown) for forming the connector housing 22. The terminal material 61 is shaped like an integral body that couples the portions of the respective connector terminals 32 embedded in the connector housing 22. The terminal material 61 is formed by punching out a conductive metal plate material into a predetermined shape by undergoing pressing and bending at a plurality of positions.

Then, the mold in which the terminal material 61 is arranged is filled with a melted insulating resin material. The lid 41 is molded integrally with the connector housing 22 in the present embodiment. Thus, in addition to a cavity that forms the connector housing 22, the mold includes a cavity that forms the lid 41 in a state coupled to the connector housing 22.

When the insulating resin material in the mold is cooled and solidified, the connector housing 22 is formed integrally with the lid 41. The connector housing 22 and the lid 41 in the mold are in the positional relationship shown in FIG. 11A. That is, the lid 41 is open with respect to the connector housing 22 by 90 degrees. Accordingly, the bottom 43a and the side walls 43c and 43d of the lid 41 are parallel with the insertion direction X and its side wall 43b is orthogonal to the insertion direction X. Therefore, despite the connector housing 22 being formed integrally with the lid 41, the connector housing 22 and the lid 41 can be easily taken out of the mold by moving the mold in two directions, to the front side and the rear side in the insertion direction X. Then, as shown in FIG. 11B, the connector housing 22 taken out of the mold supports the terminal material 61 by embedding the terminal material 61. Further, part of the connector housing 22 that couples the connector terminals 32 in the terminal material 61 overlaps with the cutting hole 33 to be exposed through the cutting hole 33 without being embedded in the resin material of the connector housing 22.

Subsequently, a terminal cut-off process is performed for cutting off the terminal material 61 to form the connector terminals 32. In the terminal cut-off process, a portion 61a that couples the connector terminals 32 in the terminal material 61 is pressed and cut off. The connector housing 22 is arranged on a die (not shown), which is used for pressing, and a punch is inserted into the cutting hole 33 to cut the portion 61a that couples the connector terminals 32 in the terminal material 61. As a result, the connector terminals 32 are separated from each other. In the terminal cut-off process, the die is inserted into the connector housing 22 from either one of the connection opening 26a and the insertion opening 27a, while the punch is inserted into the connector housing 22 from the other one of the two openings.

Subsequently, as shown in FIG. 12, a connector boot formation process is performed for forming the connector boot 25. In the connector boot formation process, the connector housing 22 formed integrally with the lid 41 is arranged in a mold for forming the connector boot. Then, the mold is filled with a melted elastomer. When the elastomer in the mold is cooled and solidified, the connector boot 25 is formed integrally with the connector housing 22. In the connector boot formation process, simultaneously with the formation of the connector boot 25, the seal 28 is formed on the connection opening end face 26b integrally.

Subsequently, a control circuit substrate insertion process (layout process) is performed for inserting the control circuit substrate 51 into the connector housing 22. The control circuit substrate 51 is inserted into the substrate holder 35 from the edge on the side of the first connection terminal 51a in the insertion direction X until it abuts against the substrate positioning protrusion 38. As a result, the control circuit substrate 51 is held by the substrate holder 35 with respect to the connector housing 22.

Subsequently, a relay layout process is performed for arranging the relay 54 on the connector housing 22. In the relay layout process, as shown in FIGS. 9 and 12, first the relay 54 is arranged at a position that faces the insertion opening 27a and orthogonally intersects with the insertion direction X (that is, so that the thickness direction of the relay 54 may be parallel to the insertion direction X). The relay 54 has the two anti-noise elements 53 electrically connected beforehand. Then, the relay 54 is moved toward the front side in the insertion direction X until it abuts against the positioning face 30. In this situation, the plurality of second connection terminals 51b are inserted into the plurality of first through holes 54a respectively and the plurality of connector terminals 32 are inserted into the plurality of second through holes 54b respectively. Simultaneously, the two anti-noise elements 53 are inserted into the element accommodation portion 27c. Further, the relay 54 goes over the positioning protrusion 31a by elastically deforming the positioning pin 31 to abut against the positioning face 30 and be sandwiched between the positioning face 30 and the positioning pin 31. In such a manner, the relay 54 is supported on the connector housing 22.

The relay 54 arranged with respect to the connector housing 22 through the insertion opening 27a is at a right angle with the control circuit substrate 51 and orthogonally intersects with the insertion direction X. The electronic components mounted on the relay 54 are all positioned on the bottom side of the insertion recess 27 rather than the relay 54.

Subsequently, a soldering process (connection process) is performed for electrically interconnecting the second connection terminal 51b of the control circuit substrate 51, the connector terminal 32, and the relay 54. In the soldering process, the second connection terminal 51b, the connector terminal 32, and the relay 54 are each soldered through the insertion opening 27a. In this case, as shown in FIG. 6B, the insertion opening end face 27b is inclined so that its distance from the connection opening 26a decreases as the connector connection portion 23 becomes farther along the axial direction of the connector connection portion 23. Accordingly, the second connection terminal 51b, the connector terminal 32, and the relay 54 project (are exposed) from the insertion opening 27a and outside of the connector housing 22. Therefore, they can be easily soldered because their soldering portions are exposed through the insertion opening 27a to the outside of the connector housing 22. In such a manner, the second connection terminal 51b of the control circuit substrate 51, the connector terminal 32, and the relay 54 are electrically connected to each other by soldering.

Subsequently, a lid mounting process is performed to close the insertion opening 27a with the lid 41. In the lid mounting process, first the lid 41 is pivoted relative the connector housing 22 so that the lid 41 closes the insertion opening 27a. Then, the flange portion 42 and the insertion opening end face 27b abutting against each other are joined to each other by ultrasonic welding. As a result, the lid 41 is fixed to the connector housing 22 and hermetically sealed. This completes the connector module 21.

The first embodiment has the advantages described below.

(1) The flat relay 54 electrically connecting the connector unit C and the flat control circuit substrate 51 to each other is arranged at a right angle with the control circuit substrate 51. This allows the control circuit substrate 51 and the relay 54 to be coupled in a compact state. Therefore, for example, the connector module 21 can be reduced in size more than when the control circuit substrate 51 and the relay 54 are arranged parallel in the insertion direction X. Further, the connector module 21 does not greatly extend sideward from the motor, and the motor including the connector module 21 can be reduced in size.

(2) The control circuit substrate 51 is arranged parallel to the insertion direction X and the relay 54 is arranged perpendicularly to the insertion direction X. Thus, the connection portions (that is, the second connection terminal 51b and the first through hole 54a) between the control circuit substrate 51 and the relay 54 do not have complicated shapes. This allows for each electrical connection of the control circuit substrate 51 and the relay 54 thereby improving the mounting performance of the connector module 21 and reducing the costs for manufacturing the connector module 21.

(3) Each of the electronic components (that is, the control circuit substrate 51 and the anti-noise element 53) mounted on the relay 54 are arranged on the surface of the relay 54 that faces the insertion direction X. Accordingly, it is possible to compactly arrange the relay 54 and the electronic components mounted on the relay 54. Therefore, the connector module 21 can be further reduced in size. Further, the relay 54 and the electronic components can be electrically interconnected more easily than when mounting the electronic components on the relay 54 in a plurality of directions. This further improves the mounting performance of the connector module.

(4) The control circuit substrate 51 is held by the substrate holder 35 with respect to the connector housing 22. Therefore, the position of the control circuit substrate 51 with respect to the connector housing 22 is stabilized, so that the connection between the control circuit substrate 51 and the relay 54 is maintained stably. Further, the control circuit substrate 51 is not displaced relative to the connector housing 22. Thus, the control circuit substrate 51 can be easily inserted into the fixed portion 12a.

(5) When inserting the control circuit substrate 51 into the insertion opening 12c, the insertion of the control circuit substrate 51 into the insertion opening 12c is guided by the insertion guide 37. Therefore, the control circuit substrate 51 can be easily inserted into the insertion opening 12c. As a result, the connector housing 22 can be easily fixed to the fixed portion 12a.

(6) By inserting the control circuit substrate 51 into the insertion opening while inserting the insertion guide protrusion 12k formed on the gear housing 12 into the insertion guide 37, the movement of the control circuit substrate 51 into the gear housing 12 in the insertion direction X is guided. Therefore, the control circuit substrate 51 can be easily inserted into the gear housing 12. Further, the movement of the control circuit substrate 51 into the gear housing 12 in the insertion direction can be guided by the insertion guide 37 having a simple shape of a slit.

(7) The connector housing 22 includes the positioning face 30 and the positioning pin 31 that support the relay 54 so that the position of the relay 54 with respect to the connector housing 22 is stabilized. As a result, soldering and other work are performed easily after the relay 54 is mounted to the connector housing 22.

(8) The control circuit substrate 51 and the power feeding components (power feeding brush etc.) arranged in the yoke 2 and the gear housing 12 can be connected through the insertion opening 12c and the connection opening 26a.

(9) The seal 28 that prevents liquid from entering the motor from between the connection opening end face 26b and the insertion opening end face 12d is formed integrally with the connector housing 22. This reduces the number of components. Further, when mounting the control circuit substrate 51 etc. to the connector housing 22, the seal 28 is not separated from the connector housing 22 so that it is possible to further easily manufacture the connector housing 22 and insert the connector housing 22 into the gear housing 12.

(10) The insertion opening 27a is formed in the connector housing 22 separately from the connection opening 26a connected to the insertion opening 12c. The layout of the relay 54 to the connector housing 22 and the electrical connection between the relay 54 and the control circuit substrate 51 can be easily performed by using the insertion opening 27a. Further, even after the connector housing 22 is inserted into the gear housing 12, the inside of the connector housing 22 can be viewed through the insertion opening 27a. Therefore, the maintenance etc. of the control circuit substrate 51 can be performed easily.

(11) The connection recess 26 and the insertion recess 27 are formed parallel to the insertion direction X. Therefore, the directions in which the control circuit substrate 51 and the relay 54 are mounted to the connector housing 22 respectively can be integrated into a direction parallel to the insertion direction X. As a result, it is possible to improve the performance of mounting the control circuit substrate 51 and the relay 54 to the connector housing 22.

(12) The insertion opening end face 27b is inclined with respect to the insertion direction X so that the connection portion between the second connection terminal 51b and the relay may project from the insertion opening 27a to the outside of the connector housing 22. Therefore, even after the control circuit substrate 51 and the relay 54 are mounted to the connector housing 22, the second connection terminal 51b and the relay 54 can be electrically connected easily. Further, the end of the insertion opening end face 27b close to the connector connection portion 23 is positioned in the vicinity of the rear side of the connector connection portion 23 in the insertion direction X. Therefore, by inclining the connector housing 22 so that the insertion opening end face 27b is parallel with a flow soldering bath when immersing the second connection terminal 51b, the terminal of the anti-noise element 53, the connector terminal 32, and the relay 54 into the flow soldering bath, the connector connection portion 23 and the connector boot 25 enclosing the connector connection portion 23 hardly enter the flow soldering bath. Therefore, flow soldering can be performed easily.

(13) The insertion opening 27a is closed by the lid 41 so that the control circuit substrate 51 and the relay 54 arranged in the connector housing 22 are protected by the connector housing 22 and the lid 41.

(14) The connector housing 22 and the lid 41 are formed integrally with each other, so that the components can be managed easily. Further, the lid 41 can be mounted to the connector housing 22 easily. Moreover, it is unnecessary to provide an apparatus for manufacturing the lid 41 independently of the apparatus for manufacturing the connector housing 22. This reduces the facility costs for manufacturing the connector module 21.

(15) If the insertion opening end face 27b and the peripheral portion (that is, the flange portion 42) of the lid 41 are welded to each other, the welded portion between the insertion opening end face 27b and the lid 41 hermetically seals a boundary between the insertion opening end face 27b and the lid 41. Therefore, it is possible to prevent liquid from entering the connector housing 22 from the insertion opening 27a without providing a seal between the insertion opening end face 27b and the lid 41 separately.

(16) On the connector housing 22, the element accommodation portion 27c that accommodates the anti-noise element 53 is formed. Therefore, it is unnecessary to separately form a cover etc. to cover and protect the anti-noise element 53, so that the number of the components of the connector module 21 including the anti-noise element 53 can be reduced. Moreover, the element accommodation portion 27c in the present embodiment is formed by utilizing a part that provides a dead space on the connector housing 22 on the lateral side (lateral side of the axis L2) of the connector connection portion 23. The dead space is produced between the relay 54 and the connection opening end face 26b when the relay 54 is arranged at a right angle with the control circuit substrate 51. Therefore, the connector module 21 is not enlarged because the element accommodation portion 27c is formed on the connector housing 22.

(17) The connector housing 22 can be fixed to the gear housing 12 by hooking the hook claw 39 to the gear housing 12. This improves the performance of mounting the connector module 21 to the gear housing 12. Further, the number of components can be reduced as compared to the case of separately providing a component for fixing the connector housing 22 to the gear housing 12.

(18) The hook claw 39 is formed so that it is within a range of the thickness of the motor, that is, the range of the thickness of the gear housing 12. Therefore, the motor is prevented from becoming large in the thickness direction of the gear housing 12 because of the hook claw 39.

(19) The cutting hole 33 extends through the connector housing 22 in the insertion direction X, so that in the terminal cut-off process, chips that occur when the terminal material 61 is cut off can be easily disposed of from the connector housing 22.

(20) The insertion opening 27a is formed in the connector housing 22 separately from the connection opening 26a connected to the insertion opening 12c. Generally, the shape of the insertion hole 24 conforms to the shape of an external connector on the side of the vehicle and thus changes in accordance with the vehicle. When writing control information for controlling rotation of the rotary shaft 4 by utilizing the connector terminal 32 to the control circuit substrate 51, a connector that conforms to the shape of the connector unit C will be inserted. Therefore, a plurality of kinds of connectors would be necessary in order to write the control information to the control circuit substrate 51. Further, the control information for controlling the rotation of the rotary shaft 4 includes information specific to the vehicle in which the motor is mounted. Accordingly, if the control information cannot be written to the control circuit substrate 51 by utilizing the connector terminal 32, it may be necessary to form a plurality of kinds of the control circuit substrates 51 to which the control information is written that corresponds to the vehicle in which the motor is mounted. To solve the problem, by forming the insertion opening 27a in the connector housing 22 as in the case of the present embodiment, a connector that conforms to the second connection terminal 51b can be connected to the second connection terminal 51b by utilizing the insertion opening 27a. Therefore, a motor for various vehicle models can be formed easily if the control circuit substrate 51 to which only the control information common to those vehicles is written, and a connector having a shape that conforms to the second connection terminal 51b is available. As a result, the manufacturing costs can be reduced because it is unnecessary to use a plurality of kinds of connectors that conform to the shape of the connector unit C or form a plurality of kinds of the control circuit substrates 51 to which the control information is written for the vehicle in which the motor is mounted.

(21) The restriction projection 34 inhibits the anti-noise element 53 from tilting. This prevents unstable connection between the terminal of the anti-noise element 53 and the relay 54. Further, when mounting the relay 54 to the connector housing 22, the terminal of the anti-noise element 53 can be inserted easily into the third through hole 54c.

(22) The lid 41 is formed to have such a shape that the mold can be pulled out from the connector housing 22 in two directions, to the front side and the rear side in the insertion direction X when the lid 41 is open at 90 degrees with respect to the connector housing 22. Therefore, the mold can be reduced in size as compared to when forming the lid 41 so that the mold can be pulled out from the connector housing 22 when the lid 41 is open with respect to the connector housing 22 by more than 90 degrees. As a result, the costs of the mold can be reduced.

(23) The second connection terminal 51b, the connector terminal 32, and the terminal of the anti-noise element 53 are soldered to the relay 54 from the outside of the connector housing 22. In the present embodiment, the soldering can be performed easily because the electronic components mounted to the relay 54 are all arranged on a surface of the relay 54 that comes inside the connector housing 22 (the bottom side of the insertion recess 27).

(24) The connector boot 25 and the seal 28 are formed integrally with each other. Thus, a manufacturing apparatus for integrally forming the connector boot 25 and the seal 28 on the connector housing 22 remains simple. As a result, it is possible to reduce the costs of manufacturing facilities for forming the connector boot 25 and the seal 28.

(25) The insertion opening end face 27b is planar. Thus, a boundary between the insertion opening end face 27b and the lid 41 can be sealed easily.

(26) In the connector housing formation process, the terminal material 61 is put in the mold and embedded into the connector housing 22 so that the terminal material 61 may be supported by the connector housing 22. Therefore, the connector terminal 32 can be supported by the connector housing 22 easily as compared to when supporting each of a plurality of the separated connector terminals 32 with the connector housing 22. Further, in the terminal cut-off process, the terminal material 61 is cut off from the cutting hole 33 by utilizing the two openings of the connection opening 26a and the insertion opening 27a, thereby the terminal material 61 can be cut off in the connector housing 22. Therefore, it is possible to inhibit the connector housing 22 and the terminal material 61 from becoming complex in shape and also to easily cut off the portion 61a of the terminal material 61 that couples the connector terminals 32 to each other. Moreover, the connector terminal 32 and the relay 54 can be electrically connected to each other easily because the connection is performed in condition where the connector terminal 32 and the relay 54 are supported by the connector housing 22. This enables easy manufacturing of the connector module 21.

(27) The connector terminal 32 is L-shaped and has a simple shape. Therefore, the connector module 21 has a simple shape.

(28) The components of the motor (component for feeding power to the armature etc.) arranged in the yoke 2 and the gear housing 12 can be connected to the control circuit substrate 51 through the connection opening 26a, while the relay 54 can be arranged to the connector housing 22 through the insertion opening 27a. Therefore, when arranging the relay 54 on the connector housing 22, the parts of the connector module 21 (that is, the end of the control circuit substrate 51 on the side of the first connection terminal 51a, the substrate holder 35, etc.) that are inserted into the gear housing 12 do not act as obstacles. As a result, the mounting performance of the connector module 21 is improved. Accordingly, the productivity of the connector module 21 improves. This reduces the manufacturing costs of the motor.

(29) When inserting the connector module 21 into the gear housing 12, the insertion of the substrate holder 35 into the fixed portion 12a is guided by the first axial positioning projection 12m and the second axial positioning projection 12n. Those first axial positioning projection 12m and second axial positioning projection 12n position the substrate holder 35 with respect to the gear housing 12 in the central axis L1, thereby positioning the connector module 21 with respect to the gear housing 12 in the central axis L1 of the rotary shaft 4. Therefore, the connector module 21 can be inserted into the gear housing 12 more easily.

(30) The insertion opening 27a is formed in a side surface differing from that in which the connection opening 26a is formed among the plurality of side surfaces of the connector housing 22. Moreover, the connection recess 26 is formed in the end of the connector housing 22 on the front side in the insertion direction X, while the insertion recess 27 is formed in the end of the connector housing 22 on the rear side in the insertion direction X. Accordingly, when arranging the relay 54 on the connector housing 22, the part of the connector module 21 to be inserted into the gear housing 12 does not act as an obstacle. As a result, the mounting performance of the connector module 21 is further improved. Therefore, the productivity of the connector module 21 improves further. This further reduces the motor manufacturing costs.

(31) In the relay layout process, the relay 54 is supported on the connector housing 22 by the insertion opening 27a, which differs from the connection opening 26a closed by the gear housing 12. Therefore, when arranging the relay 54 on the connector housing 22 in the relay layout process, the part of the connector module 21 to be inserted into the gear housing 12 does not act as an obstacle. Further, the insertion opening 27a is closed by the lid 41 after the soldering process, so that the electrical connection portion between the connector terminal 32 and the relay 54 is protected. Additionally, the cutting hole 33 is formed to communicate to the connection opening 26a and the insertion opening 27a, so that if the insertion opening 27a is closed by the lid 41, the lid 41 also closes the opening of the cutting hole 33 on the side of the insertion opening 27a. The opening of the cutting hole 33 on the side of the connection opening 26a is closed by the gear housing 12 when the connector module 21 is inserted into the gear housing 12. Therefore, in the connector module 21 including the connector housing 22 having two openings of the connection opening 26a and the insertion opening 27a, a liquid is prevented from entering the connector housing 22 through the cutting hole 33. Moreover, it is possible to close the insertion opening 27a and the opening of the cutting hole 33 on the side of the insertion opening 27a simultaneously by the lid 41, thereby manufacturing the connector module more easily.

(32) In the soldering process, electrical connection between the connector terminal 32 and the relay 54 can be performed simultaneously with the electrical connection between the control circuit substrate 51 and the relay 54, thereby manufacturing the connector module 21 more easily. Further, it is possible to reduce the time necessary for the electrical connection between the connector terminal 32 and the relay 54 and the electrical connection between the control circuit substrate 51 and the relay 54. This improves the productivity. As a result, the manufacturing costs of the connector module 21 can be further reduced.

Second Embodiment

The following will describe a second embodiment of the present invention with reference to the drawings. Identical reference numerals are given to identical components over the present embodiment and the first embodiment described above, and description thereof will not be repeated here.

A connector module 81 in the second embodiment shown in FIG. 13 is mounted to a motor instead of the connector module 21 in the first embodiment. A connector housing 82 of the connector module 81 is formed of an insulating resin material and shaped like a generally rectangular solid. And one side surface (left side surface in FIG. 13) of the connector housing 82 has a connector connection portion 23 formed on it. An axis L2 of the connector connection portion 23 is perpendicular to an insertion direction X. Further, at a radial midpoint of the connector connection portion 23, an insertion hole 24 is formed which extends from the connector connection portion 23 to an inside of the connector housing 82, and a periphery of the connector connection portion 23 is surrounded by a connector boot 25. The connector boot 25 is formed integrally with the connector housing 82.

Further, an end of the connector housing 82 on the front side in the insertion direction X (end toward the user in FIG. 13) has a connection recess 83 formed in it parallel to the insertion direction X. A connection opening 83a in the connection recess 83 opens toward the front side in the insertion direction X and is shaped like a rectangle that is longer than the insertion opening 12c (see FIG. 5) in a direction that orthogonally intersects with the insertion direction X and the axis L2. Further, an opening end face 83b (hereinafter referred to as connection opening end face 83b) around the connection recess 83 intersects with the insertion direction X orthogonally (that is, is parallel to the axis L2 of the connector connection portion 23) and has a seal 28 formed on it integrally with itself.

Figure 15:
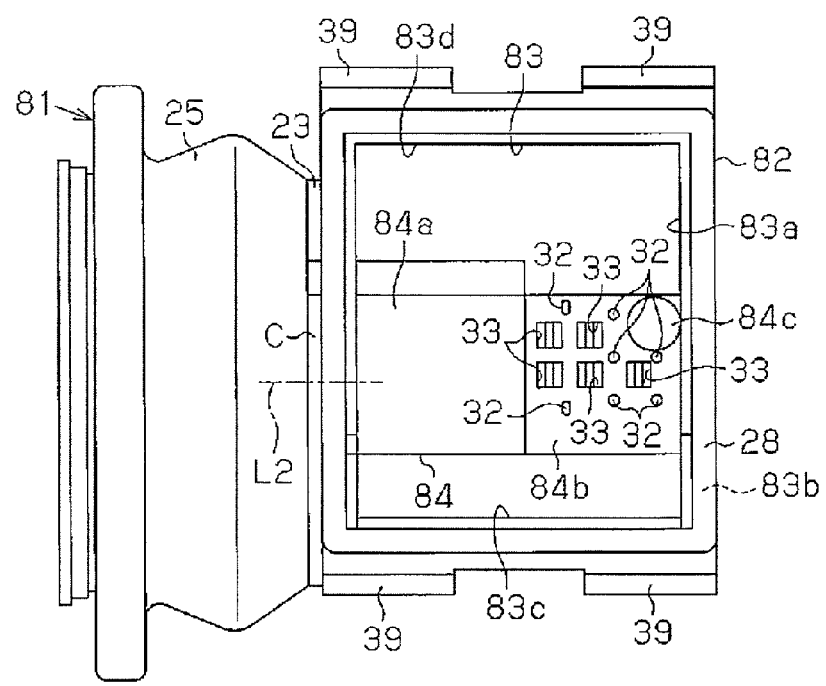
FIG. 15 is a side view showing the connector module of FIG. 13.

Further, as shown in FIG. 15, in the connection recess 83, a terminal holding portion 84 is formed which projects from the bottom surface of the connection recess 83 toward the connection opening 83a along the insertion direction X. In FIG. 15, the insertion direction X is perpendicular to the paper and directed to the user from the side of the paper away from him. The terminal holding portion 84 is formed so that it may divide an internal space of the connection recess 83 into two segments in a direction (up-and-down direction in FIG. 15) that orthogonally intersects with the insertion direction X and the axis L2 of the connector connection portion 23. Then, since the connection recess 83 is provided with the terminal holding portion 84, the terminal holding portion 84 has a substrate insertion portion 83c formed on its one side (lower side in FIG. 15) and an element accommodation portion 83d formed on the other side thereof (upper side in FIG. 15).

Further, a positioning portion 84a that accounts for about a half of the terminal holding portion 84 on the side of the connector connection portion 23 is formed to be higher (projects to the side of the connection opening 83a more) than a terminal projecting portion 84b that accounts for the other half of the terminal holding portion 84 on the opposite side of the connector connection portion 23. Moreover, the tip face of the positioning portion 84a intersects with the insertion direction X orthogonally and the tip face of the terminal projecting portion 84b also intersects with the insertion direction X orthogonally. Further, the square-shaped tip face of the terminal projecting portion 84b has a column-shaped positioning protrusion 84c formed at its corner. The tip face of the positioning protrusion 84c intersects with the insertion direction X orthogonally.

Figure 16A:
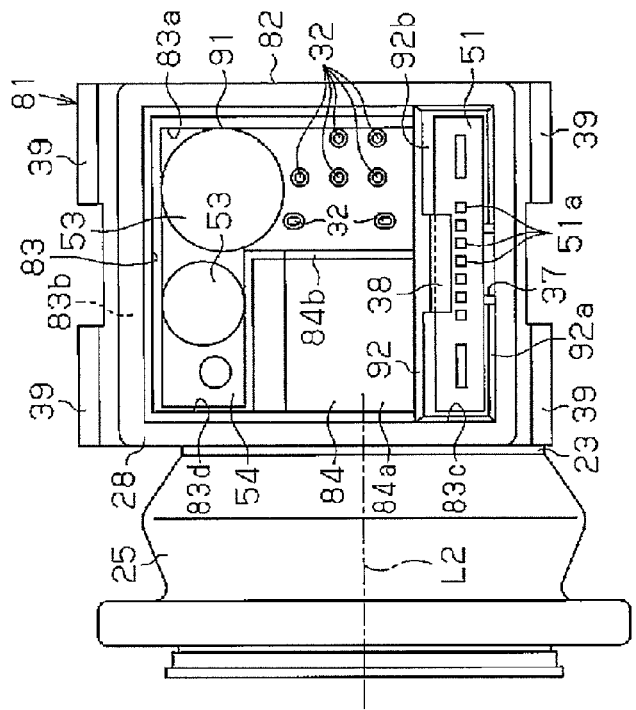
FIG. 16A is a front view showing the connector module of FIG. 13.
Figure 16B:
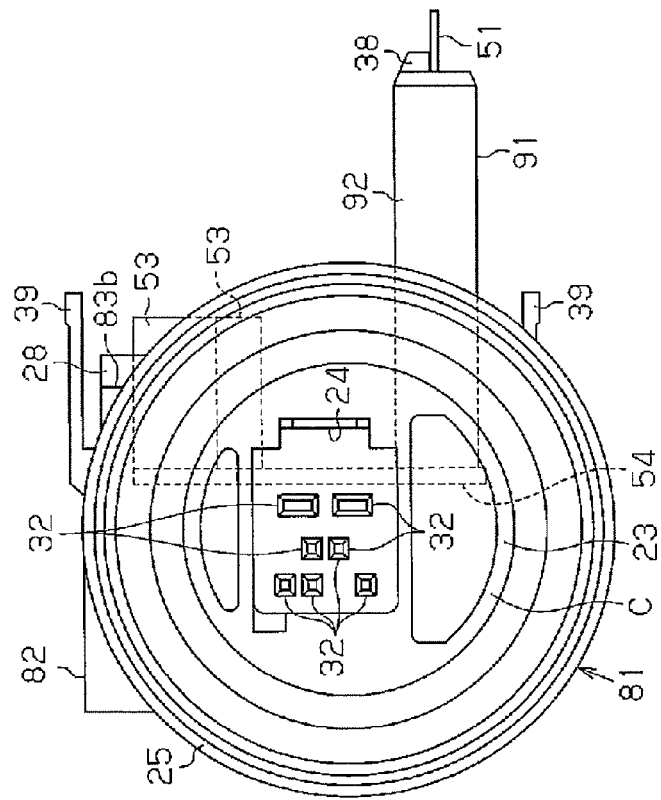
FIG. 16B is a side view showing the connector module of FIG. 13.

Further, the connector housing 82 has a plurality of (seven in the present embodiment) connector terminals 32 embedded in it by employing insertion formation. As shown in FIGS. 16A and 16B, those connector terminals 32 extend from the inside of the insertion hole 24 along the axis L2 of the connector connection portion 23 into the terminal holding portion 84 in the connector housing 82 and then are bent at 90 degrees to extend through the inside of the terminal projecting portion 84b in the insertion direction X. That is, each of the connector terminals 32 is shaped like letter L in that it is bent only at one portion in its longitudinal direction. Further, an end of each connector terminal 32 on the side of the connector connection portion 23 projects from the bottom of the insertion hole 24 to the internal space of the insertion hole 24, while the other end of each connector terminal 32 on the side of the terminal holding portion 84 projects from the tip face of the terminal projecting portion 84b into the connection recess 83. Then, those connector terminals 32 are held in the connector housing 82 in condition where they are separate from each other.

Figure 14:
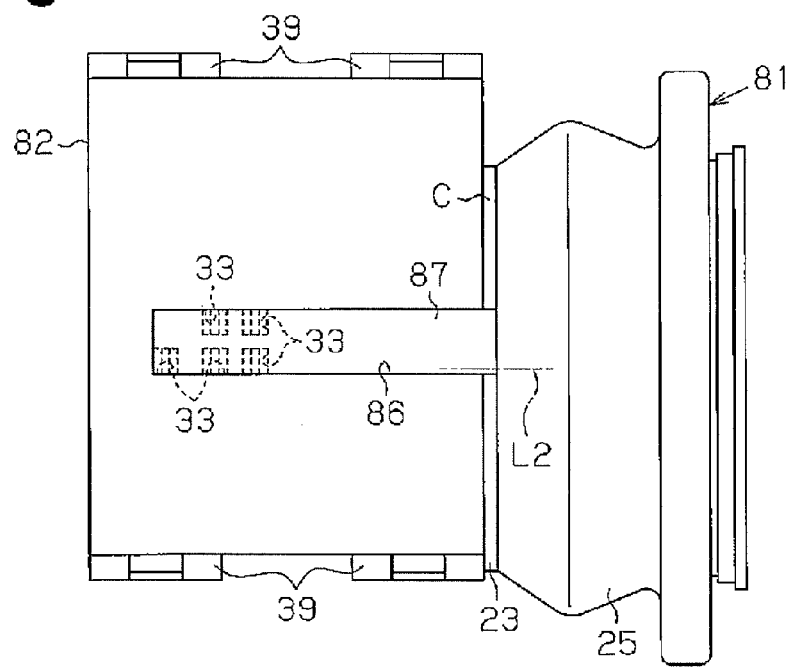
FIG. 14 is a side view showing the connector module of FIG. 13.

Further, as shown in FIGS. 14 and 15, the connector housing 82 has a plurality of (five in the present embodiment) cutting holes 33 formed in it that extend through the connector housing 82 in the insertion direction X. Each of the cutting holes 33 extends through the connector housing 82 from the tip face of the terminal projecting portion 84b to the end face of the connector housing 82 on the opposite side of the connection opening 83a. Therefore, the cutting holes 33 causes the outside of the connector housing 82 and the inside of the connector housing 82 (that is, the inside of the connection recess 83) to communicate with each other. Further, each cutting hole 33 is formed between the plurality of connector terminals 32. Moreover, as shown in FIG. 14, the end of the connector housing 82 on the opposite side of the connection opening 83a has a burial recess 86 in a region including openings of the plurality of cutting holes 33. The burial recess 86 is shaped like a trench that extends in the axis L2 direction. The burial recess 86 is filled with a seal 87 that is made of an elastomer and closes the cutting holes 33. Therefore, the seal 87 prevents a liquid from entering the connector housing 82 through the cutting holes 33. The seal 87 is formed integrally with the connector housing 82 and also done so integrally with the connector boot 25. Further, the connector housing 82 has four hook claws 39 formed on its peripheral portion.

Figure 17A:
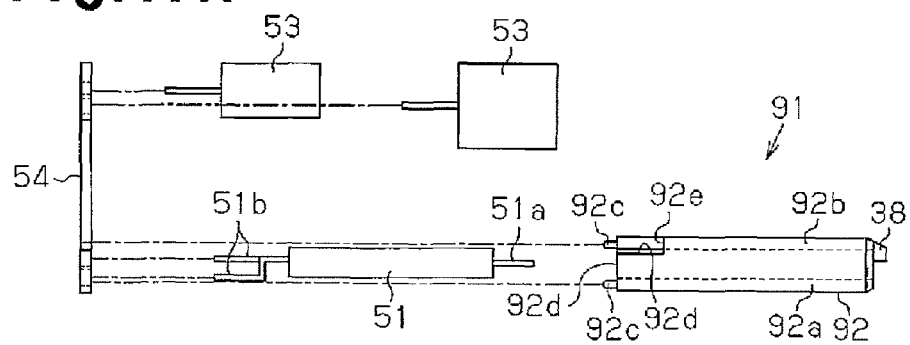
FIG. 17A is an exploded side view showing a control circuit unit of FIG. 13.

As shown in FIGS. 16A and 16B, the connection recess 83 accommodates a control circuit unit 91. As shown in FIG. 17A, the control circuit unit 91 includes a relay 54, a control circuit substrate 51 and two anti-noise elements 53 which are connected to the relay 54, and a substrate holder 92 which holds the control circuit substrate 51.

The substrate holder 92 is formed of an insulating resin material and shaped like a generally rectangular tube that matches the outer shape of the control circuit substrate 51. As shown in FIG. 16B, the substrate holder 92 is formed so that its thickness may somewhat larger than the width of the substrate insertion portion 83c in a direction (up-and-down direction in FIG. 16B) that orthogonally intersects with the insertion direction X and the axis L2 of the connector connection portion 23. Further, at the midpoint of a side wall 92a (lower side wall in FIG. 16B) out of the two side walls of 92a and 92b of the substrate holder 92 in the thickness direction, an insertion guide 37 is formed. Moreover, at the midpoint of the tip face of the other side wall 92b, a substrate positioning protrusion 38 is formed.

Further, as shown in FIG. 17A, the base end face of the substrate holder 92 is shaped like a plane that orthogonally intersects with the longitudinal direction of the substrate holder 92. Two holding projections 92c project from the base end face of the substrate holder 92. One of the two holding projections 92c is formed on the base end face of the side wall 92a, while the other holding projection 92c is formed on the base end face of the side wall 92b. Further, those two holding projections 92c are columnar in shape.

Moreover, the base end portion of the substrate holder 92 has a positioning notched portion 92d formed in it. The positioning notched portion 92d is, as shown in FIGS. 16B and 17A, has a shape that the part facing the positioning portion 84a on the substrate holder 92 when the substrate holder 92 is inserted into the connection recess 83 is notched. A bottom surface 92e of the positioning notched portion 92d is shaped like a plane parallel to the relay 54.

The control circuit substrate 51 is inserted into the substrate holder 92 from the base end portion of the substrate holder 92 so that a first connection terminal 51a may be arranged on the side of the tip of the substrate holder 92. Then, the control circuit substrate 51 abuts against the substrate positioning protrusion 38 in the substrate holder 92, thereby getting positioned with respect to the substrate holder 92 in the insertion direction.

Figure 17B:
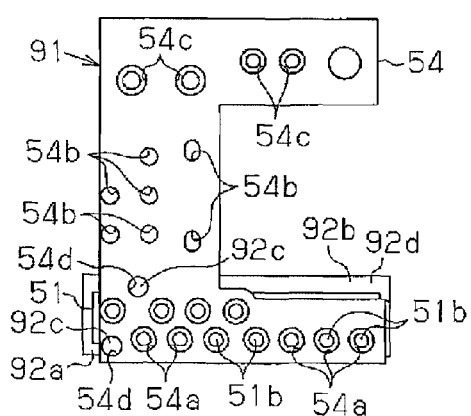
FIG. 17B is a side view showing the control circuit unit of FIG. 13.

Further, as shown in FIG. 17B, the relay 54 has two projection insertion holes 54d formed in it in the vicinity of the first through hole 54a. In formation, the positional relationship between the plurality of first through holes 54a and the two projection insertion holes 54d is arranged to be the same as that between the plurality of second connection terminals 51b and the two holding projections 92c on the control circuit substrate 51 inserted into the substrate holder 92. Further, the inner diameter of each of the projection insertion holes 54d is arranged to be nearly equal to the outer diameter of the holding projection 92c.

Figure 18:
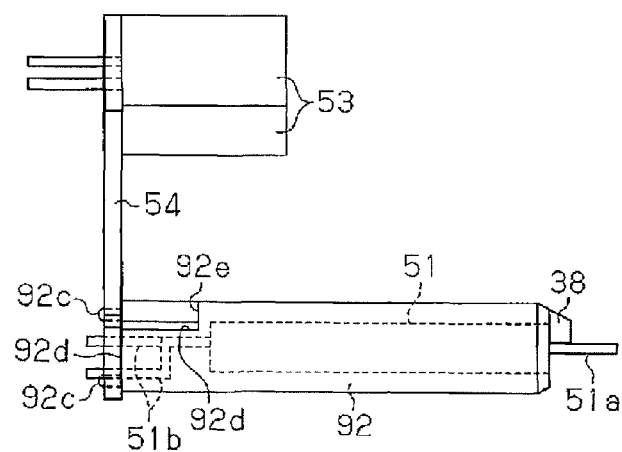
FIG. 18 is a side view showing the control circuit unit of FIG. 13.

The control circuit substrate 51 inserted into the substrate holder 92 is arranged with respect to the relay 54 in condition where the plurality of second connection terminals 51b are inserted into the plurality of first through holes 54a of the relay 54 respectively and the two holding projections 92c are inserted into the projection insertion holes 54d respectively. Then, as shown in FIG. 18, the relay 54 is arranged to be at a right angle with the control circuit substrate 51. Further, the plurality of second connection terminals 51b are electrically connected to the relay 54 by soldering. Moreover, the base end face of the substrate holder 92 abuts against the relay 54, so that the substrate holder 92 inhibits the control circuit substrate 51 from tilting toward the relay 54. Further, as shown in FIGS. 17A and 17B, by inserting the two holding projections 92c into the projection insertion holes 54d respectively, the control circuit substrate 51 is inhibited from moving with respect to the relay 54 in the planar direction of the relay 54.

Further, the terminals of the two anti-noise elements 53 are inserted through the third through holes 54c respectively and electrically connected to the relay 54 by soldering. The two anti-noise elements 53 are arranged with respect to the relay 54 on the same side of the thickness direction of the relay 54 as the control circuit substrate 51.

As shown in FIG. 13, such a control circuit unit 91 is inserted into the connection recess 83 along a direction parallel to the insertion direction X so that the relay 54 may be on the side of the bottom portion of the connection recess 83 and the control circuit substrate 51 and the anti-noise elements 53 may be on the side of the connection opening 83a. Then, the relay 54 abuts against the positioning protrusion 84c (see FIG. 15) in the direction parallel to the insertion direction X, thereby getting positioned with respect to the connector housing 82 in the insertion direction X. Moreover, into each of the second through holes 54b, the connector terminal 32 projecting from the terminal projecting portion 84b (see FIG. 15) is inserted. Then, the connector terminals 32 inserted into the respective second through holes 54b are electrically connected to the relay 54 by soldering.

Further, the base end portion of the substrate holder 92 holding the control circuit substrate 51 is inserted into the substrate insertion portion 83c. Accordingly, the substrate holder 92 is restricted in its movement in a direction that orthogonally intersects with the axis L2 and the insertion direction X and in the axis L2 direction with respect to the connector housing 82 by the inner circumference surface of the substrate insertion portion 83c. Therefore, the control circuit substrate 51 is held by the substrate holder 92 with respect to the connector housing 82. Moreover, as shown in FIGS. 13 and 18, the part of the positioning portion 84a that neighbors the control circuit substrate 51 is inserted in the positioning notched portion 92d. The tip face of the positioning portion 84a abuts against the bottom surface 92e of the positioning notched portion 92d, thereby restricting the substrate holder 92 in its movement in a direction parallel to the insertion direction X with respect to the connector housing 82. Further, the end of the control circuit substrate 51 arranged to the connector housing 82 close to the first connection terminal 51a projects from the connection opening 83a to the outside of the connector housing 82.

The connector module 81 having such a configuration is inserted into the fixed portion 12a along the insertion direction X as inserting the substrate holder 92 holding the control circuit substrate 51 into the insertion opening 12c from the tip side of the substrate holder 92 as shown in FIGS. 13 and 5. In this situation, the insertion guide protrusion 12k is inserted into the insertion guide 37 of the substrate holder 92, while the substrate holder 92 is inserted between the first axial positioning projection 12m and the second axial positioning projection 12n. Further, the seal 28 provided on the connection opening end face 83b comes in tight contact with the peripheral portion of the insertion opening 12c in the fixed portion 12a. And the four hook claws 39 of the connector housing 82 are snap-fit engaged to the hooking protrusion 12p of the gear housing 12, thereby fixing the connector module 81 to the gear housing 12.

Next, a description will be given of a method for manufacturing the connector module 81 in the present embodiment.

Figure 19A:
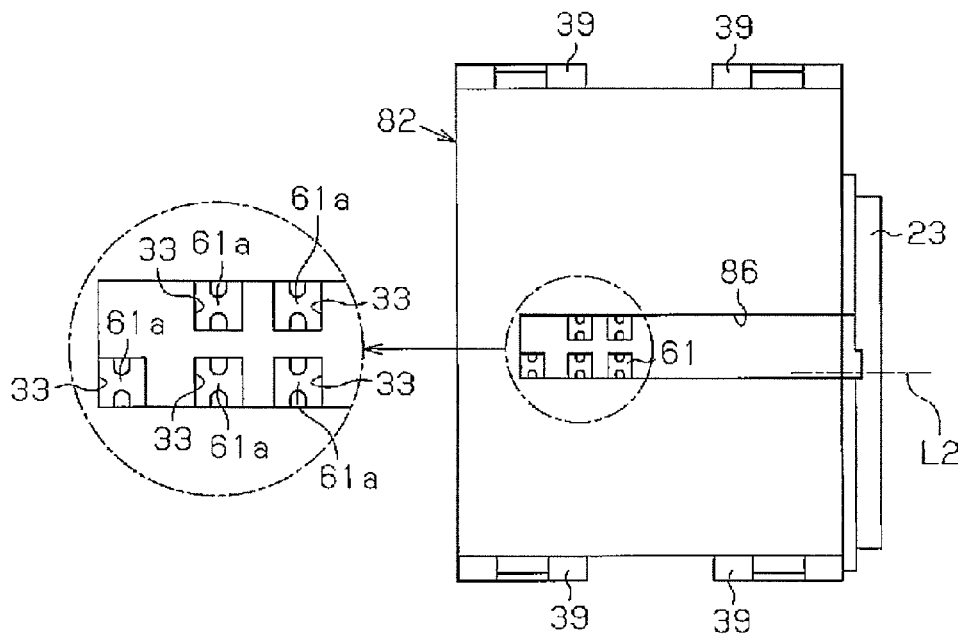
FIGS. 19A and 19B are side views showing the connector housing of FIG. 13.
Figure 19B:
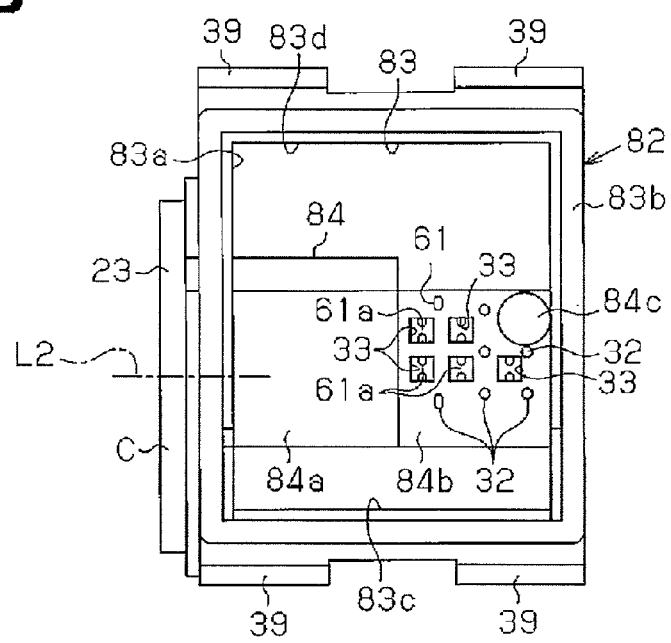

First, a connector housing formation process (support process) is performed for forming the connector housing 82 as shown in FIGS. 19A and 19B. In the connector housing formation process, a terminal material 61 is put into a mold (not shown) for forming the connector housing 82. Then, the mold having the terminal material 61 in it is filled with a melted insulating resin material. If the insulating resin material poured into the mold is cooled and solidified, the connector housing 82 supporting the terminal material 61 is formed. A portion 61a of the formed connector housing 82 that couples the connector terminals 32 in the terminal material 61 overlaps with the cutting hole 33 so is exposed through the cutting hole 33 without being embedded into the resin material of the connector housing 82.

Subsequently, a terminal cut-off process is performed for cutting off the terminal material 61 to form the connector terminals 32. In the terminal cut-off process, similar to the first embodiment, the connector housing 82 is arranged on a die (not shown) used in press working and then a punch is inserted into the cutting hole 33 to cut off the portion 61a of the terminal material 61 that couples the connector terminals 32. That is, the portion 61a of the terminal material 61 coupling the connector terminals 32 is cut off from the connection opening 83a and the outer side opening of the cutting hole 33.

Subsequently, a connector boot formation process (waterproof member formation process) is performed for forming the connector boot 25. In the connector boot formation process, the connector housing 82 is put in a mold for forming the connector boot 25 and then the mold is filled with a melted elastomer. Then, if the elastomer in the mold is cooled and solidified, the connector boot 25 is formed in the connector housing 82 integrally as shown in FIG. 14. In the connector boot formation process, simultaneously with the formation of the connector boot 25, the seal 28 is formed on the connection opening end face 83b integrally and the burial recess 86 is filled with the elastomer, thereby forming the seal 87.

Subsequently, as shown in FIGS. 17A and 17B, a control circuit unit formation process is performed for forming the control circuit unit 91. In the control circuit unit formation process, first the control circuit substrate 51 is inserted into the substrate holder 92. Then, the second connection terminal 51b of the control circuit substrate 51 held by the substrate holder 92 is inserted into the first through hole 54a in the relay 54 in the thickness direction of the relay 54. In this situation, the base end face of the substrate holder 92 abuts against the relay 54 and the two holding projections 92c of the substrate holder 92 are inserted into the projection insertion hole 54d of the relay 54, thereby supporting the control circuit substrate 51 with respect to the relay 54. Moreover, the control circuit substrate 51 is at a right angle with the relay 54. Further, the terminals of the anti-noise elements 53 are respectively inserted into the two pairs of third through holes 54c in the relay 54 in the thickness direction of the relay 54. In this case, the two anti-noise elements 53 are arranged on one of the thickness-directional surfaces of the relay 54 on the side where the control circuit substrate 51 is arranged. Then, the second connection terminal 51b and the terminal of the anti-noise element 53 are soldered to electrically connect them to the relay 54. In such a manner, the control circuit unit 91 is completed. The order in which the control circuit substrate 51 and the anti-noise elements 53 are mounted to the relay 54 may be changed appropriately.

Subsequently, a control circuit unit insertion process (support process and layout process) is performed for inserting the control circuit unit 91 into the connector housing 22. In the control circuit unit insertion process, as shown in FIG. 13, the control circuit unit 91 is inserted from the relay 54 into the connection recess 83 toward the rear side in the insertion direction X in condition where the relay 54 is kept at a right angle with the insertion direction X. The control circuit unit 91 is moved relatively to the connector housing 82 toward the rear side in the insertion direction X until the relay 54 abuts against the positioning protrusion 84c (see FIG. 15) as inserting the plurality of connector terminals 32 projecting from the terminal projecting portion 84b into the second through hole 54b in the relay 54. If the relay 54 abuts against the positioning protrusion 84c, the base end of the substrate holder 92 holding the control circuit substrate 51 is inserted into the substrate insertion portion 83*c*. Simultaneously, as shown in FIGS. 13 and 18, the part of the positioning portion 84*a* that neighbors the control circuit substrate 51 is inserted into the positioning notched portion 92*d* and abuts against the bottom surface 92*e* of the positioning notched portion 92*d*. Moreover, the two anti-noise elements 53 are accommodated in the element accommodation portion 83*d*. As shown in FIG. 16A, inside the connector housing 82, the relay 54 is perpendicular to the insertion direction X (that is, the thickness direction of the relay 54 is parallel with the insertion direction X) and at a right angle with the control circuit substrate 51. Further, the relay 54 is supported with respect to the connector housing 82 by the positioning protrusion 84*c* and the substrate holder 92 inserted into the substrate insertion portion 83*c*.

Subsequently, a terminal connection process (connection process) is performed for electrically connecting the connector terminal 32 and the relay 54 to each other. In the terminal connection process, the connector terminal 32 and the relay 54 are electrically connected to each other from the connection opening 83*a* by soldering. In such a manner, the connector module 81 is completed.

In addition to the advantages (1) to (6), (8), (9), (16) to (19), (26), and (27) of the first embodiment, the second embodiment has the following advantages.

(33) The connector housing 82 has no opening that needs to be closed by the lid 41 in the first embodiment. Therefore, it is possible to reduce the number of the components of the connector module 81, thereby reducing the manufacturing costs.

(34) The connector boot 25, the seal 28, and the seal 87 are integral with each other, so that a manufacturing apparatus for forming the connector boot 25, the seal 28, and the seal 87 on the connector housing 22 integrally is inhibited from becoming complex in configuration. As a result, it is possible to reduce the costs of manufacturing facilities for forming the connector boot 25, the seal 28, and the seal 87.

(35) The substrate holder 92 prevents the control circuit substrate 51 from tilting with respect to the relay 54 and prevents the control circuit substrate 51 from moving in the plane direction of the relay 54. Therefore, the state of connection between the second connection terminal 51*b* and the relay 54 is inhibited from becoming unstable. Moreover, it is possible to insert the control circuit unit 91 into the connection recess 83 in condition where the posture of the control circuit substrate 51 with respect to the relay 54 is maintained. As a result, the control circuit unit 91 can be inserted into the connection recess 83 easily.

(36) The cutting hole 33 is formed so that the outside of the connector housing 82 may communicate with the inside of the connection recess 83, so that in the terminal cut-off process, the portion 61*a* of the terminal material 61 coupling the connector terminals 32 can be easily cut off from the outside of the connector housing 82 and the inside of the connector housing 82 (that is, inside of the connection recess 83).

(37) In the connector boot formation process, the cutting hole 33 is closed by the seal 87, so that a liquid is prevented from entering the connector housing 82 through the cutting hole 33. Further, the seal 87 is formed simultaneously with the connector boot 25 in the connector boot formation process, so that the cutting hole 33 can be closed by the seal 87 easily.

(38) The connector boot 25, the seal 28, and the seal 87 are integral with each other, so that a manufacturing apparatus for forming the connector boot 25, the seal 28, and the seal 87 on the connector housing 22 integrally is inhibited from becoming complex in configuration. As a result, it is possible to reduce the costs of manufacturing facilities for forming the connector boot 25, the seal 28, and the seal 87.

The embodiments of the present invention can be changed as follows.

In the embodiments, the hook claws 39 have been formed so that they may be contained within a range of the thickness of the gear housing 12 (that is, the range of the thickness of the motor). However, the hook claws 39 need not necessarily be formed to be contained within the range of the thickness of the gear housing 12. That is, the hook claws 39 may be formed to project from the gear housing 12 in the thickness direction of the gear housing 12.

In the embodiments, the hook claw 39 is formed on the connector housing 22 and the hooking protrusion 12*p* is formed in the gear housing 12. However, it may be possible to form the hooking protrusion 12*p* as a hook on the connector housing 22 and the hook claw 39 on the gear housing 12. Further, the hook claw 39 is not limited to the shape in the embodiments as long as its shape is capable of being hooked to the gear housing 12. Further, the connector housings 22 and 82 need not necessarily include the hook claw 39. In this case, the connector modules 21 and 81 are fixed to the gear housing 12 by, for example, another component intended to fix those connector modules 21 and 81 to the gear housing 12.

The connector housing 22 in the first embodiment need not necessarily includes the element accommodation portion 27*c*. If the connector housing 22 does not include the element accommodation portion 27*c*, for example, a cover intended to cover the anti-noise element 53 may be fixed to the connector housing 22.

In the first embodiment, the flange portion 42 of the lid 41 has been welded to the insertion opening end face 27*b*, thereby sealing the boundary between the insertion opening end face 27*b* and the lid 41. However, the boundary between the insertion opening end face 27*b* and the lid 41 may be sealed liquid-tightly by placing a seal between the insertion opening end face 27*b* and the flange portion 42. In this case, by forming the seal integrally with at least one of the insertion opening end face 27*b* and the flange portion 42, the number of the components is reduced. Moreover, the seal does not drop off from the connector housing 22 or the lid 41 when mounting the control circuit substrate 51 etc. to the connector housing 22, so that it is possible to further easily manufacture the connector module 21 and fix the lid 41 to the connector housing 22. The seal may be provided separately from the connector housing 22 and the lid 41.

In the first embodiment, the lid 41 has been joined to the insertion opening end face 27*b* by ultrasonic welding. However, the lid 41 may be joined to the insertion opening end face 27*b* by laser welding. This approach also gives almost the same advantages as (5) in the first embodiment. The lid 41 need not necessarily be fixed to the connector housing 22 by welding. For example, the lid 41 may be fixed to the connector housing 22 by, for example, forming a hook claw on the lid 41 and a hooking protrusion on the connector housing 22 so that the hook claw may be snap-fit engaged to the hooking protrusion.

In the first embodiment, the lid 41 has been formed integrally with the connector housing 22. However, the lid 41 may be formed separately from the connector housing 22.

In the first embodiment, the insertion opening end face 27*b* is tiled with respect to the insertion direction X so that the connection portion between the second connection terminal 51*b* and the relay 54 may project from the insertion opening 27*a* to the outside of the connector housing 22. However, the insertion opening end face 27*b* may be tiled with respect to the insertion direction X so that the connection portion between the second connection terminal 51b and the relay 54 may not project from the insertion opening 27a to the outside of the connector housing 22. Further, the insertion opening end face 27b may be formed so that it may intersect with the insertion direction X orthogonally. In this case, the length of the connector housing 22 in the insertion direction X may be adjusted so that the connection portion between the second connection terminal 51b and the relay 54 may project from the insertion opening 27a to the outside of the connector housing 22.

In the first embodiment, the connection recess 26 and the insertion recess 27 have been formed parallel to the insertion direction X. However, the insertion recess 27 need not necessarily be formed parallel to the insertion direction X. Further, the connection recess 26 and the insertion recess 27 may be formed in the connector housing 22 so that the connector housing 22 may be tubular in shape (that is, the connection recess 26 and the insertion recess 27 may have no bottom). Further, the insertion opening 27a may be formed in any one of the plurality of side surfaces of the connector housing 22.

In the first embodiment, the seal 28 maintains liquid-tightness between the insertion opening end face 12d and the connection opening end face 26b. However, the connection opening end face 26b may be welded to the gear housing 12 so as to enclose the peripheral portion of the insertion opening 12c. If the connection opening end face 23b and the peripheral portion of the insertion opening 12c in the gear housing 12 are welded to each other in such a manner, the welded portion between the connection opening end face 26b and the gear housing 12 seals a boundary between the connection opening end face 26b and the gear housing 12 liquid-tightly. Therefore, it is possible to prevent a liquid from entering the motor from between the connection opening end face 26b and the gear housing 12 without separately providing a seal between the connection opening end face 26b and the gear housing 12. The same approach may be employed also for the connection opening end face 83b in the second embodiment.

In the embodiments, the seal 28 may be formed separately from the connector housings 22 and 82. Further, the seal 28 may be formed integrally with the insertion opening end face 12d. Further, the motor need not necessarily include the seal 28.

The connector housing 22 in the first embodiment has the connection opening 26a. However, for example, if the control circuit substrate 51 is embedded into the connector housing 22, the connector housing 22 need not necessarily has the connection opening 26a. This holds true also with the connector housing 82 in the second embodiment.

In the first embodiment, the connector housing 22 has the positioning face 30 and the positioning pin 31 formed on it that support the relay 54. However, the configuration of the support unit provided to the connector housing 22 in order to support the relay 54 is not limited to it. For example, the positioning face 30 may have a caulking pin formed on it that extends parallel to the insertion direction X. In this case, the relay 54 has a caulking hole formed in it that extends through the relay 54 in its thickness direction, through which caulking hole the caulking pin is inserted. If the tip of the caulking pin is crushed by thermal caulking, the relay 54 is prevented by the caulking pin from moving in the thickness direction of the relay 54 with respect to the connector housing 22 and supported so that it cannot move parallel to the insertion direction X. Further, the connector housing 82 in the second embodiment may have the positioning face 30 and the positioning pin 31 formed on it that support the relay 54 or a caulking pin formed on it. Further, the connector housings 22 and 82 need not necessarily include such a support unit.

In the embodiments, the insertion guide 37 is shaped like a slit. However, the insertion guide 37 is not limited to the shape in the embodiments as long as it can guide insertion of the control circuit substrate 51 (substrate holder 35 or 92) into the insertion opening 12c. For example, the insertion guide 37 may be a projecting stripe that extends parallel to the insertion direction X on the peripheral surface of the substrate holder 35 or 92. In this case, the inner periphery surface of the fixed portion 12a has a slit formed in it through which the insertion guide 37 of the projecting stripe is inserted. Further, the substrate holders 35 and 92 need not necessarily include the insertion guide 37.

In the first embodiment, the substrate holder 35 has been formed on the connector housing 22 integrally with it but may be separately formed and then fixed to the connector housing 22. Further, the substrate holders 35 and 92 in the respective embodiments are not limited to a rectangular tube in shape. For example, the substrate holders 35 and 92 each may include a pair of flat plates that sandwich the control circuit substrate 51. Further, the connector module 21 need not necessarily include the substrate holder 35. Similarly, the connector module 81 need not necessarily include the substrate holder 92.

In the embodiments, the electronic components to be mounted on the relay 54 (the control circuit substrate 51 and the anti-noise elements 53) are all arranged on a surface of the relay 54 that faces the insertion direction X. However, the electronic components may be arranged on either one of the two surfaces of the relay 54 in its thickness direction.

In the embodiments, the relay 54 has been arranged at a right angle with the insertion direction X. However, the relay 54 may be arranged parallel to the insertion direction X as long as it is arranged at a right angle with the control circuit substrate 51. Even with this arrangement, almost the same advantage as (1) in the first embodiment can be obtained. Further, the relay 54 need not necessarily be arranged at a right angle with the control circuit substrate 51. For example, the relay 54 may be arranged parallel to the control circuit substrate 51.

The formation position and the opening direction of the insertion opening 12c on the gear housing 12 are not limited to those in the embodiments. For example, the insertion opening 12c may be formed in the reduction gear housing portion 12b. Further, the insertion opening 12c may be formed in the yoke 2.

The control circuit substrate 51 in the embodiments has been formed by covering the circuit substrate mounted with the plurality of electronic components with the insulating resin material. However, the configuration of the control circuit substrate 51 is not limited to it. For example, the control circuit substrate 51 may be a flat circuit substrate (which is not covered with an insulating resin material) mounted with the plurality of electronic components. Further, the control circuit substrate 51 need not necessarily be flat.

In the embodiments, the relay 54 has been the printed circuit board. However, the relay 54 is not limited to a printed circuit board as long as it is a flat member that can electrically connect the control circuit substrate 51 and the connector unit C. For example, the relay 54 may be a flat member formed by molding the plurality of terminals by using an insulating resin material. Further, the relay 54 may be formed by a wire. For example, the relay 54 may be a flat cable including a plurality of wires. If the relay 54 is formed from wire rods, the relay 54 can be reduced in size so that less space is occupied by the relay 54 in the connector module 21. This allows for further reduction in the size of the connector module 21.

In the embodiments, the second connection terminal 51b, the connector terminal 32, and the terminal of the anti-noise element 53 are electrically connected to the relay 54 by soldering. However, the electrical connection of the second connection terminal 51b, the connector terminal 32, and the terminal of the anti-noise element 53 with the relay 54 is not limited to that by soldering. For example, a press-fit terminal may be used instead. Further, the second connection terminal 51b, the connector terminal 32, and the terminal of the anti-noise element 53 may be electrically connected to the relay 54 by welding.

In the embodiments, the connector boot 25, the seal 28, and the seal 87 are all formed of an elastomer. However, the connector boot 25, the seal 28, and the seal 87 may be formed of an elastic material (rubber etc.) other than the elastomer. Further, the connector boot 25, the seal 28, and the seal 87 may be formed separately from each other. In this case, the connector boot 25, the seal 28, and the seal 87 need not be formed simultaneously.

In the embodiments, the connector terminal 32 has been shaped like letter L. However, the shape of the connector terminal 32 may be changed appropriately with its positional relationship with respect to the connector unit C and the relay 54. Further, the number of the connector terminals 32 is not limited to seven, and may be six or less or eight or more.

In the first embodiment, the control circuit substrate 51, the anti-noise element 53, and the relay 54 have all been mounted to the connector housing 22 toward the front side in the insertion direction X (from the side of the insertion opening 27a). However, the direction in which the control circuit substrate 51, the anti-noise element 53, and the relay 54 are mounted to the connector housing 22 is not limited to the direction toward the front side in the insertion direction X. The control circuit substrate 51, the anti-noise element 53, and the relay 54 may be mounted to the connector housing 22 toward the rear side in the insertion direction X (from the side of the connection opening 26a) depending on the shape of the connector housing 22.

In the connector housing formation process in the embodiments, the terminal material 61 has been put into the mold. However, the plurality of connector terminals not coupled to each other may be arranged in the mold. In this case, the terminal cut-off process is omitted. Further, in the connector housing formation process, the connector housings 22 and 82 in which the terminal material 61 is not formed by insertion may be formed. In this case, following the connector housing formation process, the support process is performed for supporting the terminal material 61 with respect to the formed connector housings 22 and 82.

In the second embodiment, in the control circuit unit formation process is performed concurrently with the connector housing formation process, the terminal cut-off process, and the connector boot formation process.

In the embodiments, the motor need not necessarily include the reduction gear unit 11. Further, the motor in the embodiments may be used as a driving source for the devices other than the power window device.

The shape of the lid 41 is not limited to that in the embodiments. The shape of the lid 41 only needs to be such as to be capable of closing the insertion opening 27a.

In the second embodiment, in the connector boot formation process, simultaneously with the integral formation of the connector boot 25 on the connector housing 82, the cutting hole 33 is closed with the seal 87. However, the formation of the connector boot 25 may be performed separately from the closing of the cutting hole 33 with the seal 87. Further, the cutting hole 33 may be closed with a lid formed separately from the connector housing 82 and fit into the cutting hole 33 besides the seal 87 integrally formed with the connector housing 82.

In the first embodiment, the second connection terminal 51b, the connector terminal 32, and the terminal of the anti-noise element 53 are electrically connected to the relay 54 simultaneously. However, the second connection terminal 51b, the connector terminal 32, and the terminal of the anti-noise element 53 need not necessarily be connected to the relay 54 simultaneously.

In the terminal cut-off process in the embodiments, the portion 61a of the terminal material 61 coupling the connector terminals 32 has been cut off by the die and the punch. However, in the terminal cut-off process in the first embodiment, the portion 61a of the terminal material 61 coupling the connector terminals 32 may be cut off by inserting a cutting jig (cutter etc.) through either one of the connection opening 26a and the insertion opening 27a. Further, in the terminal cut-off process in the second embodiment, the portion 61a of the terminal material 61 coupling the connector terminals 32 may be cut off by inserting a cutting jig (cutter etc.) through either one of the connection opening 83a and the outer side opening of the cutting hole 33.

The invention claimed is:

1. A motor comprising:
   a motor case;
   a rotary shaft accommodated and rotated in the motor case; and
   a connector module including a connector unit, which is electrically connected to an external device and supplies power, and a flat control circuit substrate, which controls rotation of the rotary shaft, wherein
      the motor case includes an insertion opening into which the connector module is inserted along an insertion direction, and
      the connector module includes a connector housing, which accommodates at least part of the control circuit substrate, and a flat relay, which electrically connects the control circuit substrate and the connector unit and is arranged at a right angle relative to the control circuit substrate.

2. The motor according to claim 1, wherein
   the control circuit substrate is arranged parallel to the insertion direction and includes two opposite ends in the insertion direction,
   each end of the control circuit substrate forms a connection terminal extending parallel to the insertion direction, and
   the relay is arranged orthogonal to the insertion direction.

3. The motor according to claim 2, wherein a plurality of electronic components including the control circuit substrate are mounted on the relay, and the electronic components are all arranged on a surface of the relay that faces the insertion direction.

4. The motor according to claim 1, wherein the connector module includes a substrate holder that holds the control circuit substrate on the connector housing.

5. The motor according to claim 1, wherein the connector housing includes an insertion guide that guides insertion of the control circuit substrate into the insertion opening.

6. The motor according to claim 5, wherein
   the connector module includes a substrate holder that holds the control circuit substrate on the connector housing;
   the insertion guide is arranged on the substrate holder, slit-shaped, and extended along the insertion direction, and the motor case includes an insertion guide protrusion extending in the insertion direction and inserted into the insertion guide.

7. The motor according to claim 1, wherein the connector housing includes a support that supports the relay.

8. The motor according to claim 1, wherein the connector housing includes a connection opening that faces the insertion opening in the insertion direction.

9. The motor according to claim 8, wherein
the connector housing includes a seal arranged between an opening end face extending around the connection opening and an opening end face extending around the insertion opening,
the seal is formed integrally with the connector housing and prevents liquid from entering the motor from between the two opening end faces.

10. The motor according to claim 8, wherein an opening end face extending around the connection opening is welded to the motor case to surround the insertion opening.

11. The motor according to claim 8, wherein the connector housing includes an insertion opening through which the relay is arranged in the connector housing.

12. The motor according to claim 11, wherein
the connector housing includes a connection recess, which includes the connection opening and accommodates the control circuit substrate, and an insertion recess, which includes the insertion opening and accommodates the relay; and
the connection recess and the insertion recess are recessed along the insertion direction.

13. The motor according to claim 11, wherein
the control circuit substrate includes a connection terminal connected to the relay, and
an opening end face extending around the insertion opening is inclined with respect to the insertion direction so that a connection portion of the connection terminal and the relay projects from the insertion opening and out of the connector housing.

14. The motor according to claim 11, wherein the connector housing includes a lid that closes the insertion opening.

15. The motor according to claim 14, wherein the lid is integrally formed with the connector housing.

16. The motor according to claim 14, wherein the opening end face around the insertion opening is welded to a peripheral portion of the lid.

17. The motor according to claim 14, wherein
a seal is formed integrally with at least one of the connector housing and the lid,
the seal is arranged between the lid and an opening end face around the insertion opening, and
the seal prevents liquid from entering the connector housing from between the lid and the opening end face around the insertion opening.

18. The motor according to claim 11, wherein the insertion opening is formed in one of a plurality of side surfaces of the connector housing, and the connection opening is formed in another one of the plurality of side surfaces of the connector housing.

19. The motor according to claim 1, wherein
the connector module includes an anti-noise element electrically connected to the relay to eliminate electric noise, and
the connector housing includes an element accommodation portion that accommodates the anti-noise element.

20. The motor according to claim 1, wherein the connector housing includes a hook that is hooked to the motor case.

21. The motor according to claim 20, wherein
the motor case has a low profile, and
the hook is formed to be within a range of a thickness of the motor case.

22. The motor according to claim 1, wherein the relay is formed by of a wire.

* * * * *